United States Patent
Takeda et al.

[11] Patent Number: 5,832,395
[45] Date of Patent: Nov. 3, 1998

[54] ELECTRIC AUTOMOTIVE VEHICLE CONTROL APPARATUS

[75] Inventors: Toshihiko Takeda, Chiryu; Tsuneyuki Egami, Gamagori, both of Japan

[73] Assignee: Nippondenso Co. Ltd., Kariya, Japan

[21] Appl. No.: 687,948

[22] Filed: Jul. 26, 1996

[30] Foreign Application Priority Data

Jul. 26, 1995 [JP] Japan .................................... 7-190501

[51] Int. Cl.⁶ .............................. G06F 17/00; G06F 7/00
[52] U.S. Cl. ............................. 701/22; 701/33; 701/34; 701/43
[58] Field of Search ................................. 701/22, 29, 30, 701/31, 32, 33, 34, 50, 43, 39, 81; 180/79.1, 415, 422, 443; 318/52, 135, 139, 161, 587

[56] References Cited

U.S. PATENT DOCUMENTS

| | | | |
|---|---|---|---|
| 5,259,473 | 11/1993 | Nishimoto | 701/43 |
| 5,271,474 | 12/1993 | Nishimoto et al. | 701/43 |
| 5,481,460 | 1/1996 | Masaki et al. | |

FOREIGN PATENT DOCUMENTS

| | | |
|---|---|---|
| 4-150701 | 5/1992 | Japan . |
| 4-192845 | 7/1992 | Japan . |
| 4-213102 | 8/1992 | Japan . |
| 5-071410 | 3/1993 | Japan . |
| 5-122801 | 5/1993 | Japan . |
| 6-321076 | 11/1994 | Japan . |
| 7-143604 | 6/1995 | Japan . |

OTHER PUBLICATIONS

Concise English Explanation of Japanese Prior Art Document 4–192845; Jul. 13, 1992.
Concise English Explantation of Japanese Prior Art Document 4–213102; Aug. 4, 1992.
Concise English Explanation of Japanese Prior Art Document 5–122801; May 18, 1993.
Concise English Explanation of Japanese Prior Art Document 6–321076; Nov. 22, 1994.
Concise English Explanation of Japanese Prior Art Document 7–143604; Jun. 2, 1995.

*Primary Examiner*—William A. Cuchlinski, Jr.
*Assistant Examiner*—Gertrude Arthur
*Attorney, Agent, or Firm*—Pillsbury Madison & Sutro

[57] ABSTRACT

One central processing unit 63 is connected to the other central processing unit 64 via a communication line 200. Various data, such as driving operational information, actuation commands, and driving conditional information, are exchanged and compared between two central processing units 63 and 64 through a communication line 200. If any disagreement is found in the comparison result, a current supply circuit 65 stops supplying current to a driving motor 1.

5 Claims, 17 Drawing Sheets

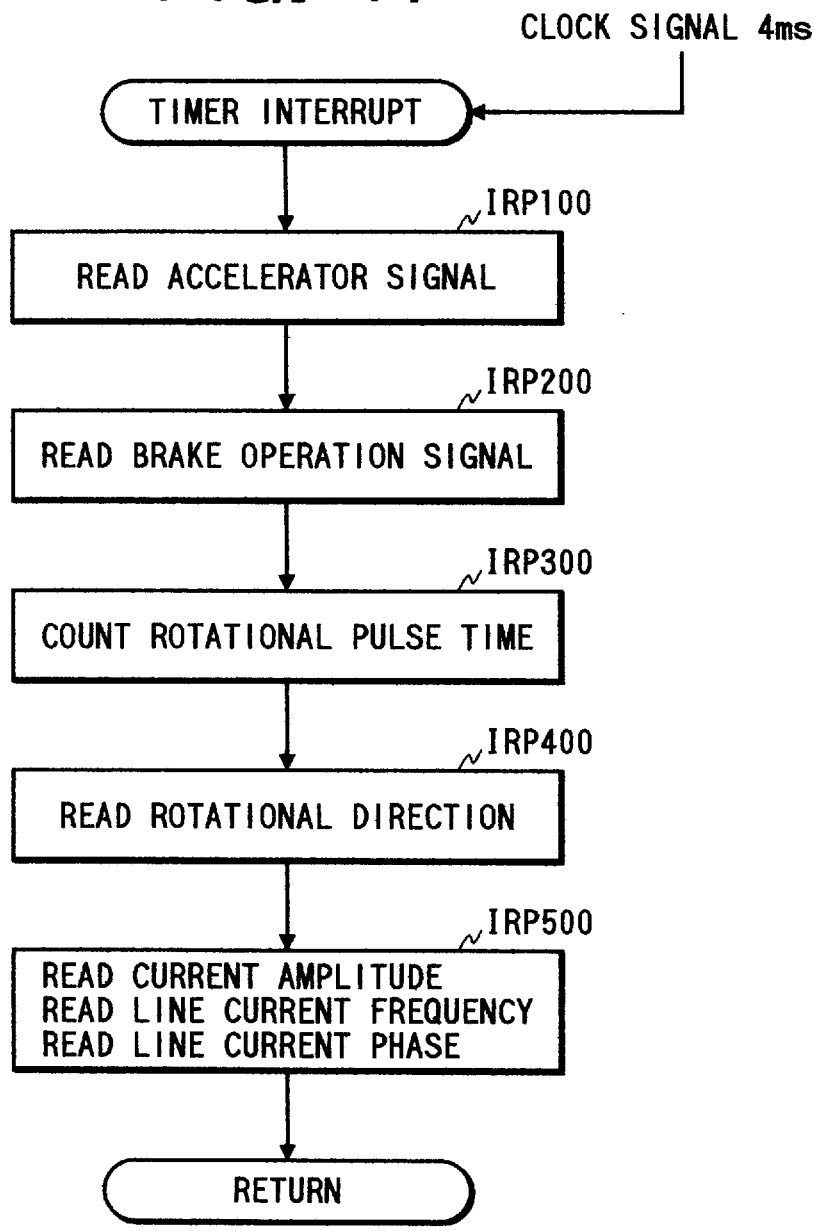

ELECTRIC AUTOMOTIVE VEHICLE CONTROL APPARATUS

BACKGROUND OF THE INVENTION

1. Field of the Invention

This invention relates to an electric automotive vehicle control apparatus for controlling a driving motor of an electric automotive vehicle. The invention relates more particularly to an electric automotive vehicle control apparatus which is capable of preventing the driving motor from causing any runaway control even if its central processing unit causes a malfunction. The apparatus thus assures a safe and reliable drive and stop control of the electric automotive vehicle.

2. Related Art

In present automotive vehicle controls, it is not rare that a plurality of central processing units are installed in a system. In order to detect any failure in a vehicle control apparatus itself or the controlled system, there are proposed some techniques in the art. This kind of automotive vehicle control is, for example, disclosed in the Unexamined Japanese Patent Application No. HEI 5-71410, published in 1993, wherein the communication data transmitted from an opposite central processing unit is checked to detect abnormality of the vehicle control system.

Furthermore, the Unexamined Japanese Patent Application No. HEI 4-150701, published in 1992, discloses a watchdog timer generating a signal whose level is changed within a predetermined cycle and uses this watchdog timer to judge the presence of an abnormality in the other central processing unit based on the inversion of this timer output.

However, according to the above-described detecting methods, an actual output of the vehicle control apparatus is not confirmed and used, hence it will be impossible to detect an abnormality in the event of runaway of the central processing unit as far as the software of the block relating to the communication data is operating normally. Furthermore, when this central processing unit is judged normal, it is impossible to detect an abnormality of the vehicle control apparatus even if input and output values of the vehicle control apparatus are abnormal in the vehicle control apparatus.

In this respect, in an internal combustion engine, its throttle valve is mechanically operable by a driver, and an accelerator pedal is mechanically linked with this throttle valve. Hence, air flow into the internal combustion engine can be reliably shut off by the driver releasing the accelerator pedal. In other words, the automotive vehicle can be manually stopped in the event of failure of the control system of the internal combustion engine.

On the contrary, in an electric automotive vehicle, its acceleration level is converted into an electric signal to control its driving motor. In other words, there is no mechanical linkage for reliably dealing with an emergency situation. To assure safe driving of the electric automotive vehicle, it is therefore highly desireable to provide a reliable control apparatus capable of stopping or driving the electric vehicle safely.

SUMMARY OF THE INVENTION

Accordingly, in view of above-described problems encountered in the related art, a principal object of the present invention is to provide a novel and excellent control apparatus for an electric automotive vehicle capable of detecting an abnormality of not only the control apparatus itself but also the entire system, and safely stopping or driving the vehicle.

In order to accomplish this and other related objects, an aspect of the present invention provides an electric vehicle control apparatus comprising a rotational information detecting means (4), a driving operational information detecting means (5, 51, 52, 53), a current detecting means (3-1, 3-2, 3-3), a driving condition detecting means (62), and a plurality of central processing units (63, 64). More specifically, the rotational information detecting means (4) detects rotational information of a driving motor (1). The driving operational information detecting means (5, 51, 52, 53) detects driving operational information of the electric vehicle. The current detecting means (3-1, 3-2, 3-3) detects line currents flowing through the driving motor (1). The driving condition detecting means (62) detects driving conditional information of the driving motor (1) based on the line currents detected by the current detecting means (3-1, 3-2, 3-3) and the rotational information detected by the rotational information detecting means (4).

Each of a plurality of processing units (63, 64) has a calculating means (S800, S900, S1000) and a driving condition confirming means (S1500, S1600). The calculating means receives the rotational information and the driving operational information and calculates an actuation command of the driving motor (1) based on the rotational information and the driving operational information. The driving condition confirming means receives the driving conditional information and confirms a driving condition of the driving motor (1).

The actuation command is sent from one central processing unit (63) to a current supply means (2, 65). The plural central processing units (63, 64) are connected via a communication line (200), to exchange data relating to at least one of the driving operational information, the actuation command, and the driving conditional information between the plural central processing units (63, 64) via the communication line (200).

An operation selecting means (S600, S700, S1100, S1200, S1700, S1800, S1900) is provided in each of the plural central processing units (63, 64) for comparing the information exchanged between the plural central processing units (63, 64) and for making a judgement as to whether the current supply means (65) should be continuously operated or deactivated.

With the above-described arrangement, the data directly relating to the driving motor, such as the driving operational information, the actuation command, or the driving conditional information, can be compared between plural central processing units. Based on this comparison result, the line current to the driving motor can be surely stopped in response to the detection of abnormal operation, thereby assuring a safe driving operation of the electric automotive vehicle.

According to preferred features of the preferred embodiments of the present invention, the central processing units (63, 64) further comprise an estimating means (S1450) for estimating an expected operational condition of the driving motor (1) based on the actuation command. The driving condition confirming means (S1500, S1600) compares the expected operational condition with the driving conditional information to confirm the presence of abnormality of the driving motor (1). And, the central processing units (63, 64) exchange the data confirmed by the driving condition confirming means (S1500, S1600) as the driving conditional information via the communication line (200).

With this arrangement, an abnormality of the driving motor can be surely detected by comparing the expected operational condition and the actual driving conditional information even if any response delay is caused due to the inductance of the driving motor.

Furthermore, according to the features of the preferred embodiments of the present invention, the operation selecting means (S600, S700, S1100, S1200, S1700, S1800, S1900) performs the comparison of exchanged information with a predetermined margin, and the margin is variable (R410, R420, R430, R500) in accordance with the actuation command calculated in the calculating means (S800, S900, S1000).

Accordingly, the comparison result is accurately obtained without being affected by the noises of inverters or the like constituting the current supply means (65) responsive to the actuation command.

Still further, according to the features of the preferred embodiments of the present invention, the driving operational information detecting means (5, 51, 51', 52, 52' 53, 53') and the driving condition detecting means (62, 62') are exclusively provided for each of the plural central processing units (63, 64).

With this arrangement, it becomes possible to immediately detect an abnormality when any of the driving operational information detecting means or the driving condition detecting means causes malfunction.

Yet further, according to the features of the preferred embodiments of the present invention, there is provided a sync means (67) which generates a sync signal for inputting the driving operational information and the driving conditional information synchronously to the plural central processing units (63, 64).

Accordingly, any dispersion of data input timing can be eliminated between plural central processing units, increasing accuracy in the information comparison in the operation selecting means (S600, S700, S1100, S1200, S1700, S1800, S1900).

Preferably, the sync means (67) is an external interrupt timer common to the central processing units or an event signal commonly entered into them.

BRIEF DESCRIPTION OF THE DRAWINGS

The above and other objects, features and advantages of the present invention will become more apparent from the following detailed description which is to be read in conjunction with the accompanying drawings, in which:

FIG. 17 is an interrupt processing program in accordance with the fifth embodiment of the present invention.

DETAILED DESCRIPTION OF THE PREFERRED EMBODIMENTS

Figure 1:
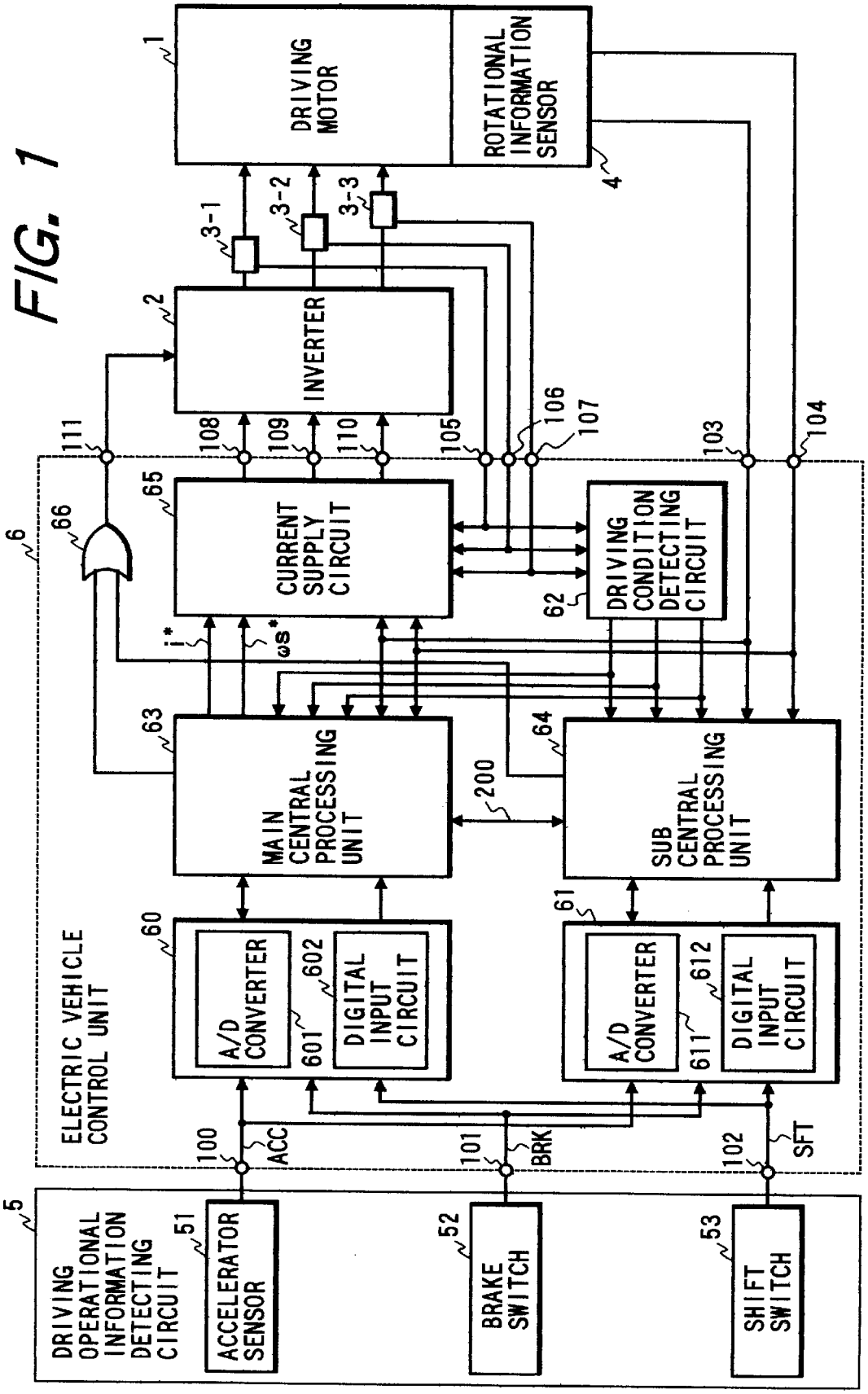
FIG. 1 is a schematic block diagram showing an electric automotive vehicle driving system incorporating a control unit in accordance with a first embodiment of the present invention.

Preferred embodiments of the present invention will be explained in greater detail hereinafter, with reference to the accompanying drawings. Identical parts are denoted by the same reference numerals in the drawing figures.

First Embodiment

FIG. 1 is a schematic view showing a driving system of an electric automotive vehicle in accordance with the present invention. A driving motor 1, which generates a driving force for an electric automotive vehicle, is a three-phase alternateing current (AC) induction motor having a total of three windings of U-phase, V-phase and W-phase and the polar pair number of 2. An inverter 2, which is a well-known type inverter supplying electric power to driving motor 1, has input terminals connected to batteries (not shown) mounted on the electric automotive vehicle. Namely, three-phase output terminals of inverter 2 are respectively connected to U-phase, V-phase and W-phase terminals of driving motor 1. Current sensors 3-1, 3-2 and 3-3, which are respectively clamped with three-phase power supply lines connecting driving motor 1 and inverter 2, detect current values of U-phase, V-phase- and W-phase power supply lines and generate current detecting signals.

A rotational information sensor 4, which detects rotational information of driving motor 1, is a well-known incremental-type rotary encoder in this embodiment. Rotational information sensor 4 is directly connected to a rotational output shaft of driving motor 1, to generate two-phase pulse signals having a phase difference of 90°, each signal generating 64 pulses per complete rotation of this rotational output shaft of driving motor 1.

A driving operational information detecting circuit 5 detects driving operations (or manipulations) of the electric automotive vehicle operated by a given driver and then generates driving operational information based on the detected data. This driving operational information detecting circuit 5, although its circuit arrangement is not disclosed in detail, comprises an accelerator sensor 51 which detects a depression amount of an accelerator pedal (not shown) and generates an acceleration amount signal as a voltage signal representing the detected accelerator depression amount, a brake switch 52 which generates a brake operation signal in response to an operation of a brake pedal (not shown), and a shift switch 53 which detects a shift position in response to an operation of a shift lever (not shown) and generates a shift signal representing the detected shift position.

An electric vehicle control unit 6 receives the rotational information detected by rotational information sensor 4, the current detecting signals detected by current sensors 3-1, 3-2 and 3-3, as well as driving operational information, such as the acceleration amount signal, the brake operation signal and the shift signal, detected by driving operational information detecting circuit 5. And, this electric vehicle control unit 6 generates actuation signals based on these input signals, and supplies these actuation signals to inverter 2, thereby controlling driving motor 1.

More specifically, electric vehicle control unit 6 comprises input terminals 100, 101 and 102 which receive the above-described driving operational information of the electric automotive vehicle obtained from the driving operational information detecting circuit 5, rotational information input terminals 103 and 104 which receive the rotational information detected by rotational information sensor 4, line current input terminals 105, 106 and 107 which receive the U-phase, V-phase and W-phase current detecting signals, actuation signal output terminals 108, 109 and 110 which send out the U-phase, V-phase and W-phase actuation signals to the inverter 2, and an inverter control command output terminal 111 which sends out a command signal of allowing the actuation of inverter 2 or prohibiting the actuation of inverter 2.

Internal arrangement of electric vehicle control unit 6 will be explained in more detail hereinafter. A first signal input circuit 60, consisting of a well-known A/D converter 601 and a well-known digital input circuit 602, receives the driving operational information including the acceleration amount signal entered from input terminal 100, the brake operation signal entered from input terminal 101, and the shift signal entered from input terminal 102. A second signal input circuit 61, consisting of a well-known A/D converter 611 and a well-known digital input circuit 612, has the same function as the first signal input circuit 61.

A driving condition detecting circuit 62 receives the U-phase, V-phase and W-phase current detecting signals entered through input terminals 105 to 107, and processes these signals (as described later in detail) to generate various control signals, such as a current amplitude signal, a phase signal and a frequency signal. A main central processing unit 63 and a sub central processing unit 64 are respectively constituted by a well-known single chip micro processor comprising a ROM for memorizing various processing control programs and a RAM for temporarily storing the detecting data and computational data.

By executing the processing programs memorized in their ROMs, these central processing units 63 and 64 calculate a torque command T* for the driving motor 1 based on the driving operational information and the rotational information of the motor 1, calculates a current command to be supplied to the driving moor 1 based on the calculated torque command T*, and obtains a current amplitude command i* and a slip frequency command ωs* based on the calculated current command and sends out these parameters to the driving motor 1.

Main central processing unit 63 and sub central processing unit 64 are connected via a communication line 200 to allow a mutual data communication. Main central processing unit 63 and sub central processing unit 64 are respectively connected to the input terminals 103 and 104 to receive the rotational information detected by rotational information sensor 4 and also connected to the output lines of the driving condition detecting circuit 62.

A current supply circuit 65 is connected to driving condition detecting circuit 62, main central processing unit 63 and input terminals 103 to 107, and generates actuation signals to the inverter 2 through output terminals 108 to 110 based on the current amplitude command i* and frequency command ωs* generated from main central processing unit 63, the two-phase rotational pulse signals generated from driving condition detecting circuit 62, and U-phase, V-phase and W-phase current detecting signals iu, iv and iw detected by current sensors 3-1, 3-2 and 3-3.

An OR gate 66, which is a well-known OR circuit having two input terminals and one output terminal, receives at their two input terminals a shutdown signal fed from main central processing unit 63 and a shutdown signal fed from sub central processing unit 64. Each of the shutdown signals, fed from the main and sub central processing unit 63 and 64, includes a command of deactivating the inverter 2. An output of this OR gate 66 is connected to the inverter control command output terminal 111 (i.e. the output terminal of electric vehicle control unit 6), thereby supplying a deactivation signal to the inverter 2 when both of central processing units 63 and 64 simultaneously generate the shutdown signals.

Figure 2:
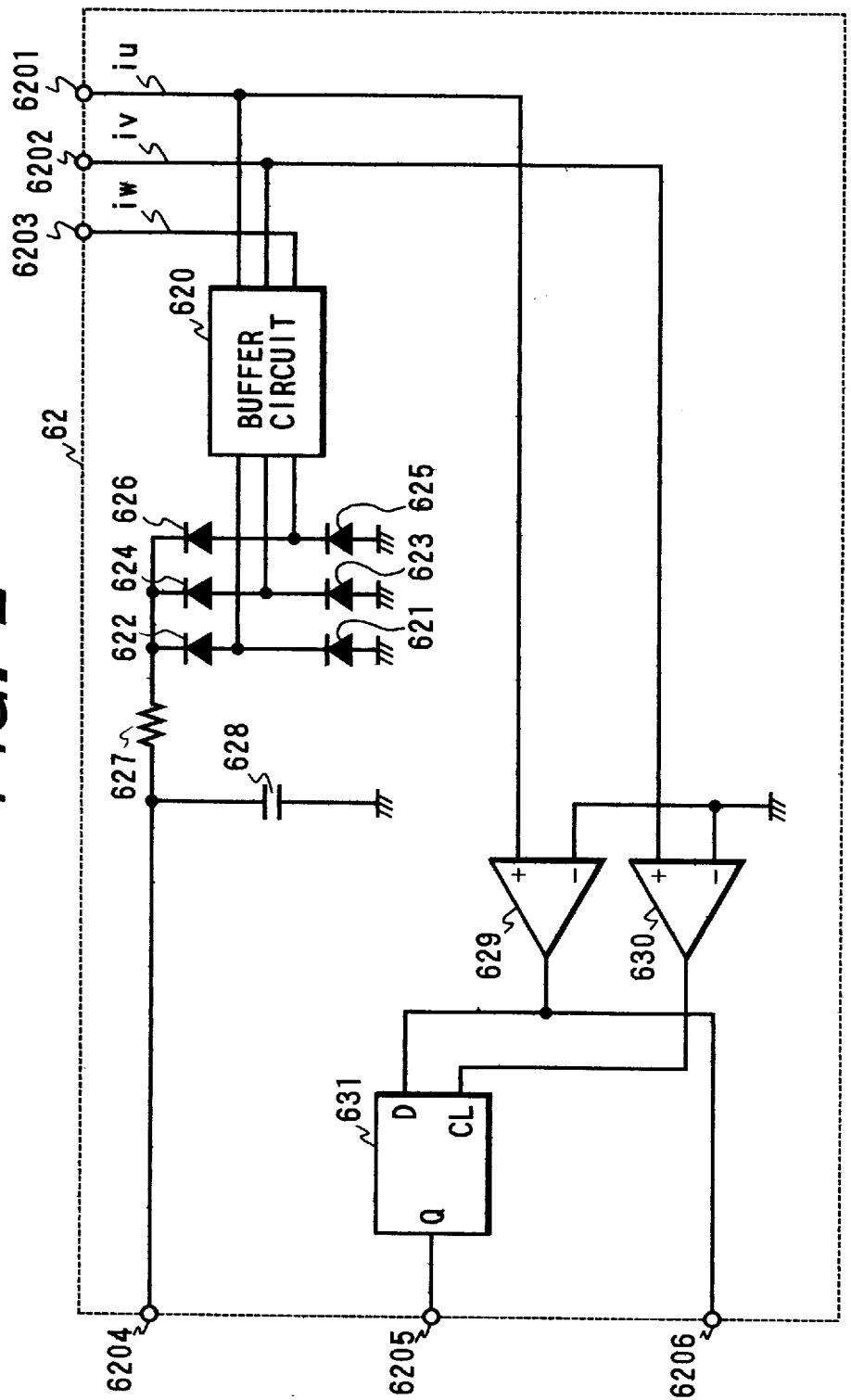
FIG. 2 is a circuit diagram showing a driving condition detecting circuit of the electric automotive vehicle driving system in accordance with the first embodiment of the present invention.

Next, an arrangement of driving condition detecting circuit 62 will be explained in detail with reference to FIG. 2.

Input terminals 6201 to 6203 are connected to input terminals 105 to 107 of electric vehicle control unit 6 to receive U-phase, V-phase and W-phase line current detecting signals iu, iv and iw detected by current sensors 3-1, 3-2 and 3-3. A buffer circuit 620, which is a well-known operational amplifier, inputs the signals entered from input terminals 6201 to 6203 and outputs these signals by an amplitude 1. Diodes 621 to 626 cooperatively constitute a three-phase full-wave rectification circuit to realize a three-phase full-wave rectification of each output of buffer circuit 620.

A resistance 627 and a capacitor 628 cooperatively constitute a primary low-pass filter to pass the low frequency components of each output of the three-phase full-wave rectification circuit when they are less than a predetermined frequency. An output of this primary low-pass filter is sent to an output terminal 6204 of the driving condition detecting circuit 62. An analog comparator 629, equipped with a positive input terminal connected to the input terminal 6201 and a negative input terminal connected to the ground, has a function of generating a zero-crossing signal of the U-phase line current detecting signal entered through input terminal 6201 and sends this zero-crossing signal from its output terminal to an output terminal 6206.

On the other hand, an analog comparator 630, equipped with a positive input terminal connected to the input terminal 6202 and a negative input terminal connected to the ground, has a function of generating a zero-crossing signal of the V-phase line current detecting signal entered through input terminal 6202. Reference numeral 631 represents a D-type flip-flop which has a data input terminal "D" connected to the output terminal of analog comparator 629, a clock input terminal "CL" connected to analog comparator 630, and an output terminal "Q" connected to an output terminal 6205 of the driving condition detecting circuit 62. Meanwhile, the output terminal of analog comparator 629 is connected to an output terminal 6206 of the driving condition detecting circuit 62.

Figure 3:
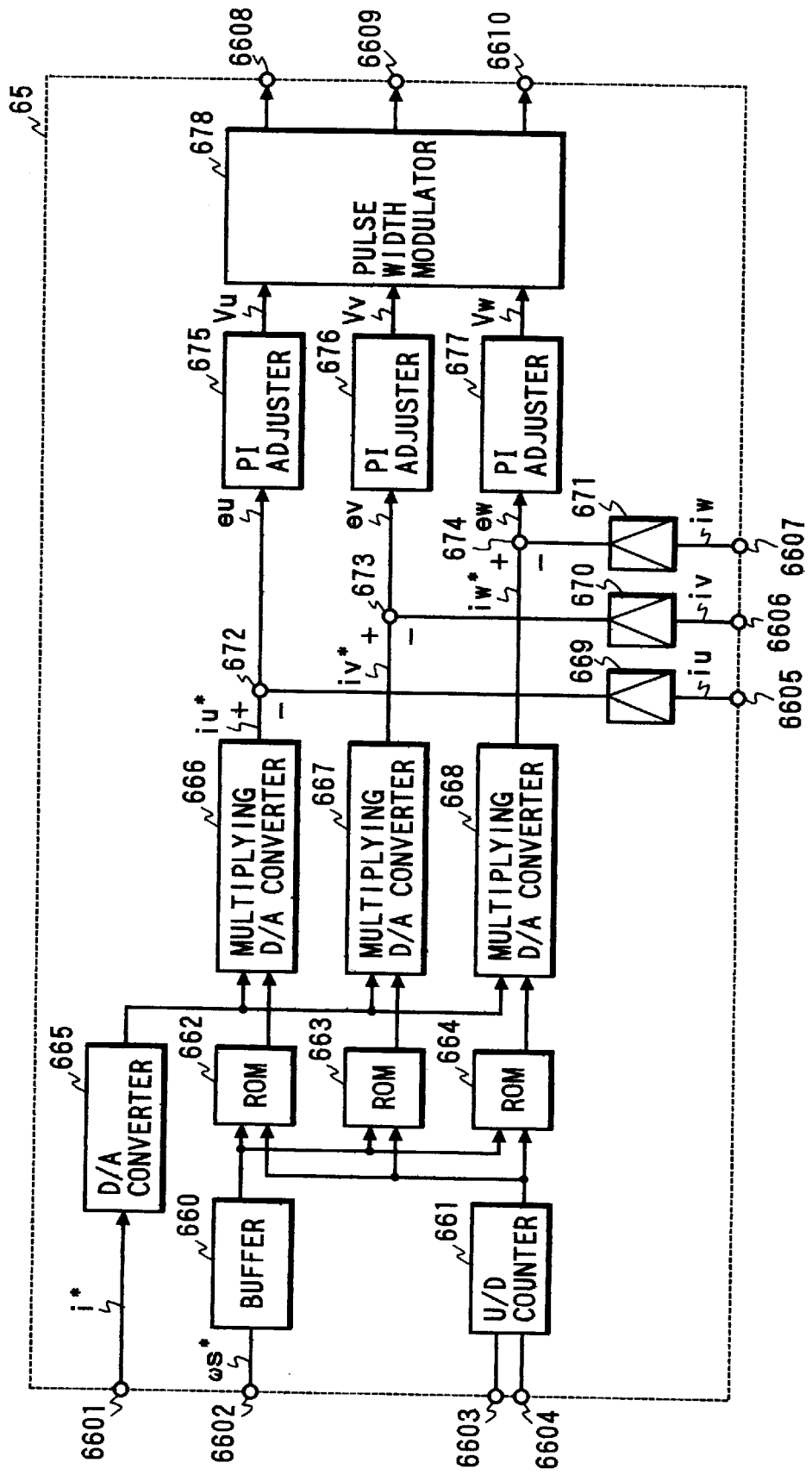
FIG. 3 is a circuit diagram showing a current supply circuit of the electric automotive vehicle driving system in accordance with the first embodiment of the present invention.

Next, an arrangement of current supply circuit 65 will be explained in detail with reference to FIG. 3. A buffer 660 receives the slip frequency command ωs* of 7 bits entered from an input terminal 6602 and performs an impedance conversion of this signal. An Up/Down counter 661 of 8 bits receives the two-phase pulse signals, which are mutually 90° offset in their phases and are entered from input terminals 6603 and 6604 respectively, and performs an Up/Down counting operation to generate a rotational position signal of 8-bit parallel. ROM 662, ROM 663 and ROM 664 memorize two cycles of a sine wave. ROM 662 memorizes U-phase data, ROM 663 memorizes V-phase data and ROM 664 memorizes W-phase data. Phases of respective data are different 2π/3 with respect to one cycle of sine wave. Readout data are 8-bit data with a sign.

D/A converter 665 receives the digital signal i*, which represents the current amplitude data of 12-bit with a sign, entered from an input terminal 6601, and then converts this digital signal i* into an analog signal and generates a voltage representing the current amplitude signal. Multiplying D/A converters 666, 667 and 668 convert the digital signals of U-phase, V-phase and W-phase sine wave data generated from ROMs 662, 663 and 664 into voltage signals, and multiply these voltage signals with the current amplitude signal generated from D/A converter 665, thereby generating voltage outputs respectively representing line current commands iu*, iv* and iw* supplied to the U-phase, V-phase and W-phase windings of driving motor 1.

Amplifiers 669, 670 and 671, respectively corresponding to current sensors 3-1, 3-2 and 3-3, receive U-phase, V-phase and W-phase current detecting signals iu, iv and iw entered from input terminals 6605, 6606 and 6607, and then amplify these signals. Subtracters 672, 673 and 674 are constituted by well-known operational amplifiers. Subtracter 672 receives the output of multiplying D/A converter 666 and the output of amplifier 669 and then generates a difference signal eu between these input signals. Similarly, subtracter 673 receives the output of multiplying D/A converter 667 and the output of amplifier 670 and then generates a difference signal ev between these input signals. Subtracter 674 receives the output of multiplying D/A converter 668 and the output of amplifier 671 and then generates a difference signal ew between these input signals.

PI adjusters 675, 676 and 677, constituted by operational amplifiers, receive the outputs eu, ev and ew of subtracters 672, 673 and 674, respectively, and then generate output voltages Vu, Vv and Vw representing the result of each proportional-and-integral adjustment. A pulse width modulator 678 receives the output signals Vu, Vv and Vw of PI adjusters 675, 676 and 677 and converts them into pulse signals each having a predetermined frequency and duty ratio variable in proportion to the input level. These pulse signals are sent to inverter 2 through output terminals 6608, 6609 and 6610 as U-phase, V-phase and W-phase actuation signals.

Next, an operation of the above-described electric vehicle control unit 6 will be explained. In the schematic driving system of an electric automotive vehicle shown in FIG. 1, when a driver operates or manipulates the accelerator pedal (not shown), the brake pedal (not shown), or the shift lever (not shown), the accelerator sensor 51 generates the acceleration amount signal in accordance with the depression amount of the accelerator pedal, the brake switch 52 generates the brake operation signal in response to the operation of the brake pedal, and the shift switch 53 generates the shift signal representing the detected shift position.

The acceleration amount signal, entered from input terminal 100, is sent as ACC to A/D converter 601 of first signal input circuit 60 and is then converted from the analog signal to a digital signal which is subsequently entered into main central processing unit 63. At the same time, the acceleration amount signal is sent to A/D converter 611 of second signal input circuit 61 and is then converted from the analog signal to a digital signal which is subsequently entered into sub central processing unit 64. Meanwhile, the brake operation signal, entered from input terminal 101, is sent as BRK to digital input circuit 602 of first signal input circuit 60 and is then entered into main central processing unit 63. At the same time, the brake operation signal is sent to digital input circuit 612 of second signal input circuit 61 and then entered into sub central processing unit 64. Similarly, the shift signal, entered from input terminal 102, is sent as SFT to digital input circuit 602 of first signal input circuit 60 and is then entered into main central processing unit 63. At the same time, the shift signal is sent to digital input circuit 612 of second signal input circuit 61 and then entered into sub central processing unit 64.

The two-phase pulse signals, detected through rotational information sensor 4 attached to driving motor 1, are entered through input terminals 103 and 104 of electric vehicle control unit 6 and supplied to main central processing unit 63, sub central processing unit 64 and current supply circuit 65.

Figure 4:
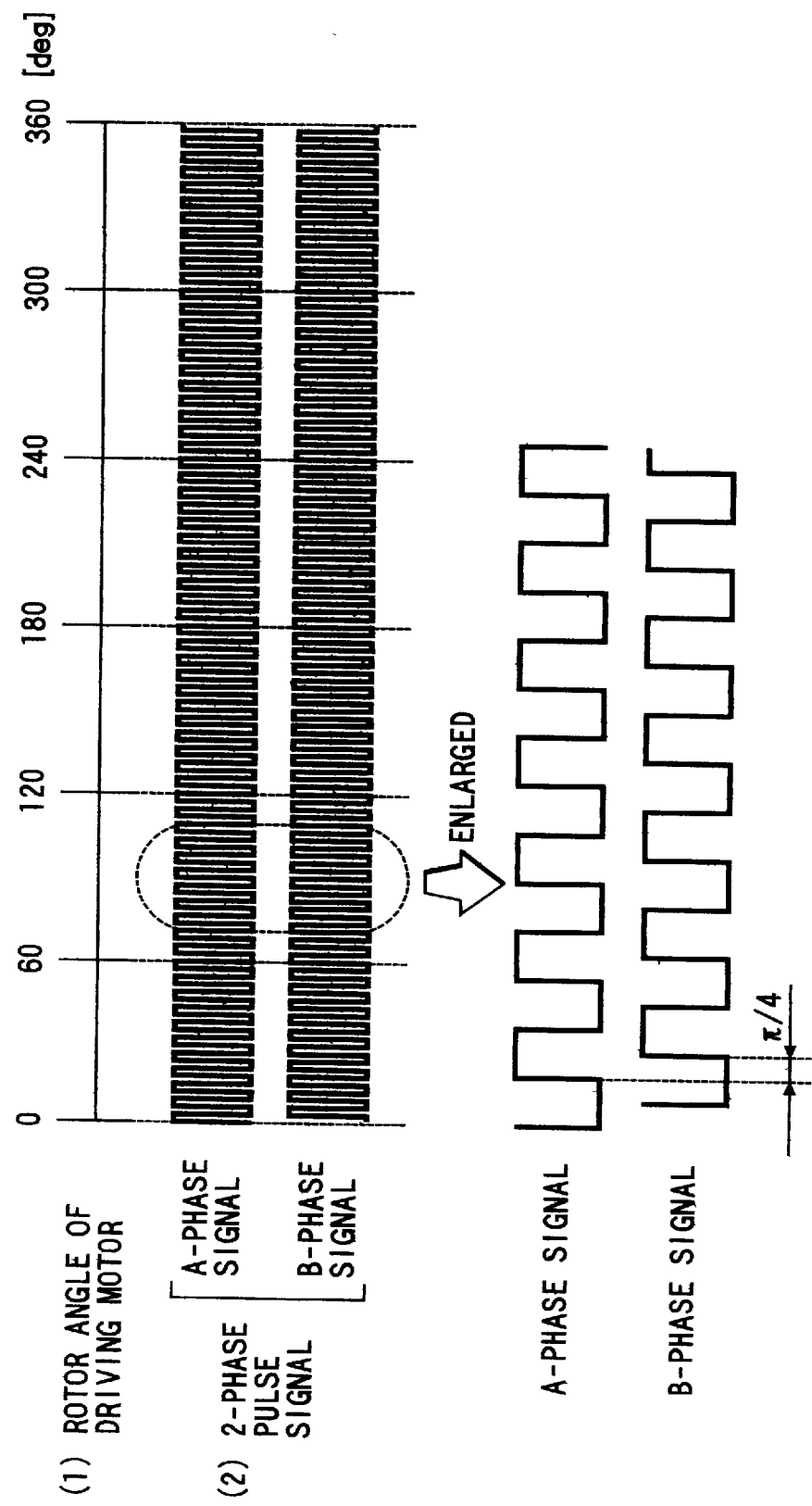
FIG. 4 is a time chart showing the output signal of the rotational information detecting sensor used in accordance with the first embodiment of the present invention.

FIG. 4 is a time chart showing the details of the two-phase pulse signals. This pulse signal takes either of binary, Hi and Low, logic levels repetitively every unit mechanical angle rotation of a rotor (not shown) of driving motor 1. In this embodiment, a total of 64 pulses are generated during a complete rotation of the rotor. The two-phase pulses consist of an A-phase signal and a B-phase signal having a phase difference π/4 with respect to one cycle of the two-phase pulse signals.

A rotational direction Dir of driving motor 1 is detectable by judging the level of the B-phase signal at the moment the A-phase signal builds up, or by judging the level of the A-phase signal at the moment the B-phase signal builds up. Two-phase pulse signals, entered into main central processing unit 63 and sub central processing unit 64, are used for calculating the rotational direction Dir and rotational speed Nm of driving motor 1.

Figure 5:
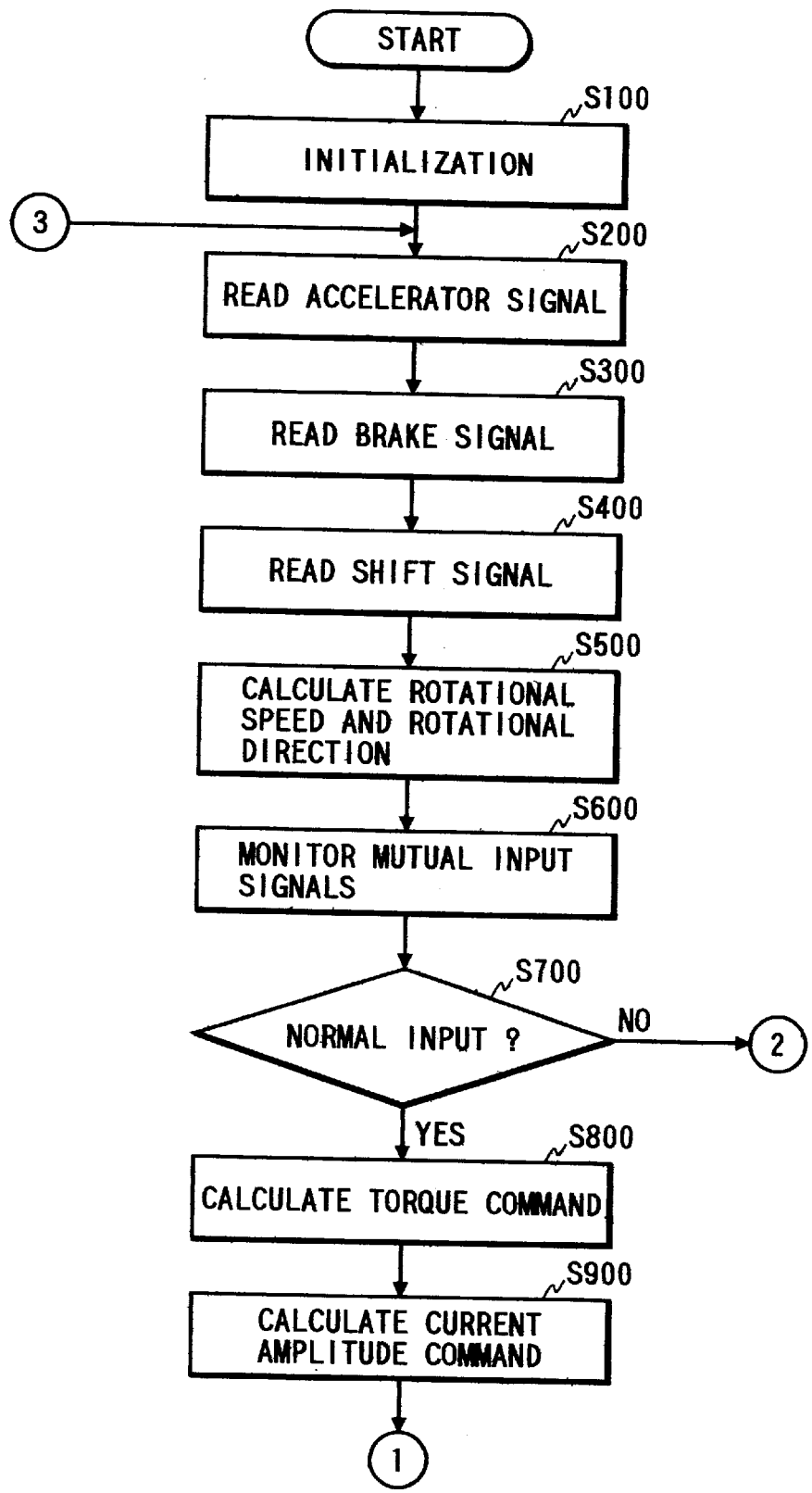
FIG. 5 is a control flow chart of each central processing unit of the electric automotive vehicle driving system in accordance with the first embodiment of the present invention.
Figure 6:
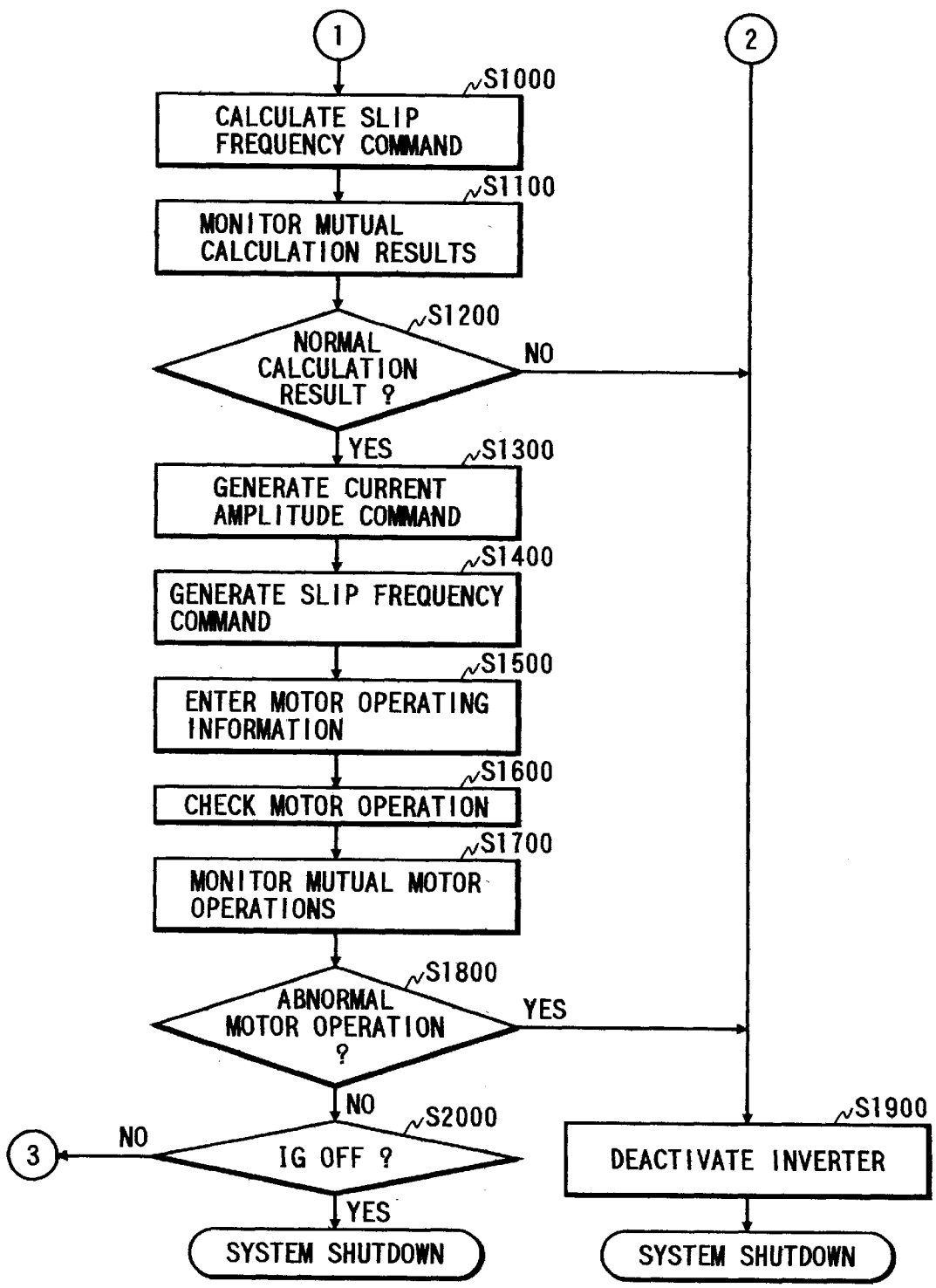
FIG. 6 is the remainder of the control flow chart of FIG. 5, used in each central processing unit of the electric automotive vehicle driving system in accordance with the first embodiment of the present invention.

Next, operations of main central processing unit 63 and sub central processing unit 64 will be explained with reference to FIGS. 5 through 8. The flow chart of FIGS. 5 and 6 show a main routine of the control program memorized in the ROM of each of main central processing unit 63 and sub central processing unit 64.

Electric vehicle control unit 6 starts its operation when electric power is supplied in response to a turning-on operation of a key switch. First in step S100, I/O ports and registers and others are initialized. In step S200, the acceleration amount signal is read and memorized as ACC in the memory. In step S300, the brake operation signal of brake switch 52 is read and memorized as BRK in the memory. In step S400, the shift signal of shift switch 53 is read and memorized as SFT in the memory.

In step S500, rotational speed Nm and rotational direction Dir of driving motor 1 are calculated based on the two-phase pulse signals and are then memorized in the memory. In step S600, main central processing unit 63 communicates with sub central processing unit 64 to fetch or receive the acceleration amount data ACC, brake switch condition data BRK, rotational speed data Nm and rotational direction data Dir memorized in the memory of sub central processing unit 64. Then, main central processing unit 63 compares these acceleration amount data ACC, brake switch condition data BRK, rotational speed data Nm and rotational direction data Dir received from sub central processing unit 64 with corresponding memory data of its own, thereby performing a mutual monitoring of the input data.

Next, in step S700, a judgement is made based on the result of the comparison in step S600. When the corresponding data are identical with each other in their values, it is judged that both of main central processing unit 63 and sub central processing unit 64 are normal, and then the control flow proceeds to the next step S800. On the other hand, when any of corresponding data are different from each other in their values, it is judged that either of main central processing unit 63 and sub central processing unit 64 is abnormal, and then the control flow proceeds to step S1900. In the step S1900, the deactivation signal is generated to stop the operation of inverter 2, thereby shutting down the system.

Figure 7:
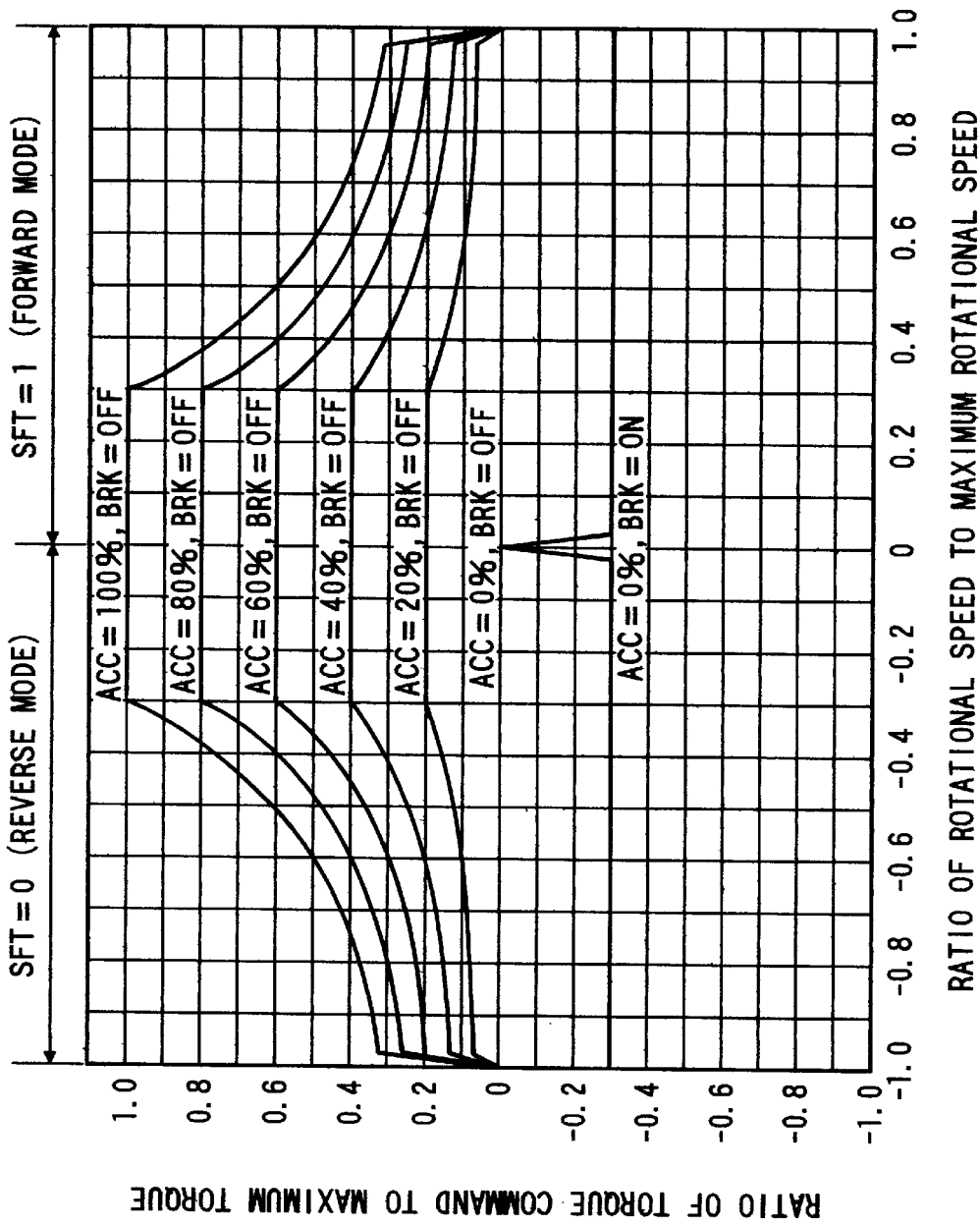
FIG. 7 is a diagram determining the torque command in accordance with the first embodiment of the present invention.

Meanwhile, in the step S800, the torque command T* applied to the driving motor is calculated based on the acceleration amount data ACC, brake switch condition data BRK, rotational speed data Nm and rotational direction data Dir memorized in the memory. FIG. 7 shows a map used in the calculation of torque command T*, wherein the relationship between torque command (T*) and rotational speed (Nm) of driving motor 1 is shown in a two-dimensional fashion using variable parameters of acceleration amount data ACC, brake switch condition data BRK and shift position data SFT.

Next, in step S900, the current amplitude command i* is obtained by performing the vector calculation, which is normally used in the vector control of an AC motor, based on the torque command T* obtained in step S800. Furthermore, in step S1000, the slip frequency command ωs* is calculated.

Subsequently, in step S1100, main central processing unit 63 communicates with sub central processing unit 64 to perform a mutual monitoring of calculation results by comparing the values of current amplitude command i* and slip frequency command ωs* calculated by main central processing unit 63 and the corresponding values of current amplitude command i* and slip frequency command ωs* calculated by sub central processing unit 64.

In step S1200, a judgement is made based on the comparison result of the step S1100. When the corresponding data are identical with each other in their values, it is judged that both of main central processing unit 63 and main central processing unit 64 are normal, and then the control flow proceeds to the next step S1300. On the other hand, when any of corresponding data are different from each other in their values, it is judged that either of main central processing unit 63 and sub central processing unit 64 is abnormal, and then the control flow proceeds to the step S1900. In the step S1900, the deactivation signal is generated to stop the operation of inverter 2, thereby shutting down the system.

In step S1300, the current amplitude command i*, which is the calculation result in the step S900, is sent to current supply circuit 65. In the next step S1400, the slip frequency command ωs*, which is calculated in the step S1000, is sent to current supply circuit 65. The procedure of these steps S1300 and S1400 is only programmed in main central processing unit 63 and not programmed in sub central processing unit 64.

In the next step S1500, the driving conditional information is entered from driving condition detecting circuit 62. The driving conditional information comprises the rotational direction of the rotary magnetic field, current amplitude i, and others which relate to the direction and magnitude of a torque generated from driving motor 1.

In the next step S1600, it is checked whether driving motor 1 is operating as commanded based on the memorized driving conditional information. And, the result of normality or abnormality of driving motor 1 is memorized. In the next step S1700, main central processing unit 63 communicates with sub central processing unit 64 to check whether the mutual operation results of driving motor 1 are identical with each other based on the result memorized in the step S1600. The judgement results are stored in their memories. Furthermore, in step S1800, a judgement is made based on the comparison result of the step S1700. When both of the judgement results of main central processing unit 63 and sub central processing unit 64 indicate the abnormality of driving motor 1, or when these judgement results are different from each other, it is judged that the motor operation is actually abnormal and therefore the control flow proceeds to the step S1900. In the step S1900, the deactivation signal is generated to stop the operation of inverter 2, thereby shutting down the system.

When both of the judgement results of main central processing unit 63 and sub central processing unit 64 indicate the normality of driving motor 1, the control flow proceeds to step S2000. In the step S2000, it is checked whether the ignition switch is turned off or not. When the ignition switch is turned off, the system is shutted down. Otherwise, the control flow further proceeds to step S200 to repeat the above-described operation.

In executing the above-described steps S600, S1100 and S1700, a shared program is used independently, the details of which will be explained with reference to the subroutine of FIG. 8.

In step R100, the judgement results stored in the result memory are all cleared and an initial value indicating the presence of no abnormality is newly memorized. Meanwhile, a loop counter i, which counts the number of comparison, is set to zero. In step R200, the data type to be received is sent to the opponent central processing unit. In step R300, data Di and data number n are received from the opponent central processing unit through data communication.

In step R400, comparison data Mi memorized in the central processing unit itself is read out in accordance with the data type. In step R500, a judgement is made as to whether the received data Di is identical with the comparison data Mi. By using the result of this judgement, a mutual monitoring operation can be performed between two central processing units. When the received data D1 is identical with the stored data M1 in the step R500, the control flow proceeds to step R700. When the received data D1 is different from the stored data M1 in the step R500, the control flow proceeds to step R600.

In step R600, the result memory is set to store the judgement result of the abnormality of either of two central processing unit. In step R700, loop counter i is incremented by 1 for the next comparison. In step R800, a judgement is made as to whether the present value of loop counter i is not smaller than the data number n, thereby checking whether all the received data are processed or not. If there are any data still remaining, the control procedure returns to the step R400 to repeat the above-described procedure. When no data to be compared is left, this subroutine is terminated and the control flow returns to the main routine.

Next, an operation of current supply circuit 65 will be explained. Current supply circuit 65 basically controls the line current of driving motor 1 based on current amplitude command i* obtained in the step S1300 and slip frequency command ωs* obtained in the step S1400.

Current amplitude command i*, entered through input terminal 6601, is converted into a voltage signal through D/A converter 665 and then entered into each of multiplying D/A converters 666, 667 and 668. Meanwhile, slip frequency command ωs*, entered through input terminal 6602, is input through buffer 660 to high-order 7 bits of the address input of each of ROMs 662, 663 and 664. The two-phase pulse signals, entered through input terminals 6603 and 6604, are counted by 8-bit Up/Down counter 661. Thus, the rotational speed of driving motor 1, which is an 8-bit parallel signal, is entered into the low-order 8 bits of the address input of each of ROMs 662, 663 and 664. Using these address signals, U-phase, V-phase and W-phase current command waveform data are read out from ROMs 662, 663 and 664 and then entered into D/A converters 666, 667 and 668. D/A converts 666, 667 and 668 multiply the above-described voltage signal representing the current amplitude with the U-phase, V-phase and W-phase current command waveform data, respectively, and, as a result of these multiplications, generate line current command signals iu*, iv* and iw* to be supplied to the U-phase, V-phase and W-phase windings of driving motor 1.

Actual line currents iu, iv and iw, flowing through U-phase, V-phase and W-phase windings of driving motor 1, are entered through input terminals 6605, 6606 and 6607 and then supplied to subtracters 672, 673 and 674 wherein they are subtracted from line current command signals iu*, iv* and iw* of corresponding phases generated from D/A converters 666, 667 and 668, respectively, thereby generating difference signals eu, ev and ew of respective phases each representing the deviation between the line current command and the actual line current. PI adjusters 675, 676 and 677 receive these signals eu, ev and ew and then perform the PI operation to produce the voltage signals Vu, Vv and Vw of respective phases to be applied to driving motor 1. Pulse width modulator 678 performs the pulse width modulation of these voltage signals Vu, Vv and Vw, and sends out the modulated signals via output terminals 6608, 6609 and 6610 as the actuation signals for inverter 2, which are supplied to inverter 2 through output terminals 108, 109 and 110 of electric vehicle control unit 6. Inverter 2 performs a switching operation in response to these actuation signals, to convert the DC-voltage power of main batteries (not shown) mounted on the electric automotive vehicle into an appropriate AC-voltage power to be supplied to respective windings of the driving motor 1.

With this operation, adequately adjusted currents flow through U-phase, V-phase and W-phase windings of driving motor 1. These line currents are detected by current sensors 3-1, 3-2 and 3-3 and then fed back through input terminals 6605, 6606 and 6607 to current supply circuit 65. Current supply circuit 65 controls the magnitude of currents flowing through U-phase, V-phase and W-phase windings of driving motor 1 based on the current amplitude command i* and the slip frequency command ωs* supplied from main central processing unit 63.

In the circuit arrangement of the above-described first embodiment, it is possible to incorporate the first signal input circuit 60 into the main central processing unit 63 and also to incorporate the second signal input circuit 61 into the sub central processing unit 64.

Furthermore, the polar pair number of driving motor 1 can be flexibly changed, although the above-described embodiment discloses the driving motor 1 of a three-phase alternate current (AC) induction motor having the polar pair number of 2 with ROMs 662 to 664 memorizing two cycles of a sine wave. In this case, the number of cycles of the sine wave to be memorized in each ROM 662 to 664 should be changed in accordance with the polar pair number.

It is also possible to replace the driving motor 1 of the present invention by a DC brushless motor. In this case, each central processing unit generates, as a motor control command to be supplied to the current supply circuit, angular information representing a phase difference with respect to the rotational position of the rotor of the motor instead of generating the slip frequency command.

As apparent from the foregoing description, the first embodiment of the present invention provides a plurality of central processing units for controlling the driving motor of an electric automotive vehicle. Each of these plural central processing units receives the driving operational information of the electric automotive vehicle, such as the acceleration amount signal, the brake operation signal and shift signal, and calculates the actuation command of the driving motor. Then, the operation of the driving motor is controlled based on thus obtained actuation command. Then, the driving conditional information of the driving motor is detected based on the line currents flowing through the windings of the driving motor under the controlled operation. Then, the data communication is performed between these plural central processing units to send or exchange the data relating to the driving operational information, actuation commands, and driving conditional information, to confirm the difference between the corresponding data and then make a judgement as to whether any abnormality is found or not. Hence, the electric automotive vehicle can be driven or stopped by taking account of this judgement result; accordingly, it becomes possible to realize a safe driving operation of an electric automotive vehicle.

Second Embodiment

Figure 12:
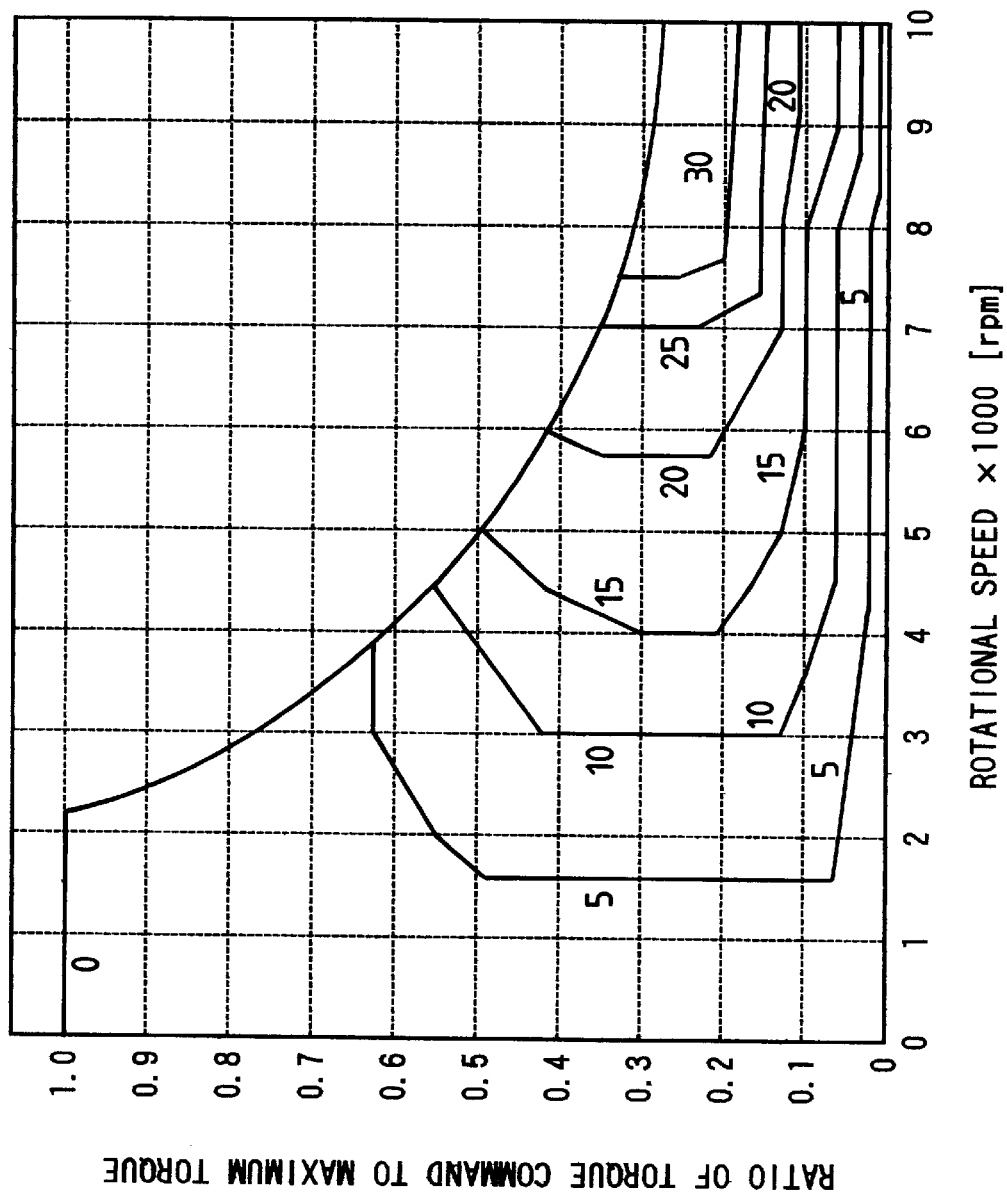
FIG. 12 is a diagram used for retrieving the estimated value in accordance with the second embodiment of the present invention.

Hereinafter, a second embodiment of the present invention will be explained with reference to FIGS. 9 and 12.

In general, some errors will be involved in actual line current values iu, iv, iw, flowing through U-phase, V-phase and W-phase windings of driving motor 1 of the first embodiment, with respect to line current command signals iu*, iv* and iw*. These errors are caused from the gain values of PI adjusters 675 to 677 which are suppressed within a predetermined finite value in order to prevent the current feedback system from oscillating due to the delay element derived from the inductance of driving motor 1.

More specifically, in order to avoid any erroneous judgement, there is a necessity of carefully performing the control of system by considering such possible errors, especially in the checking operation of the motor operation in step S1600 of FIG. 6 wherein current amplitude command i*, rotational direction command of the rotational magnetic field, and slip frequency command ωs* are compared with actual current amplitude i, actual rotational direction command of the rotational magnetic field, and actual current frequency ωo detected by driving condition detecting circuit 62 in the step S1500.

Figure 9:
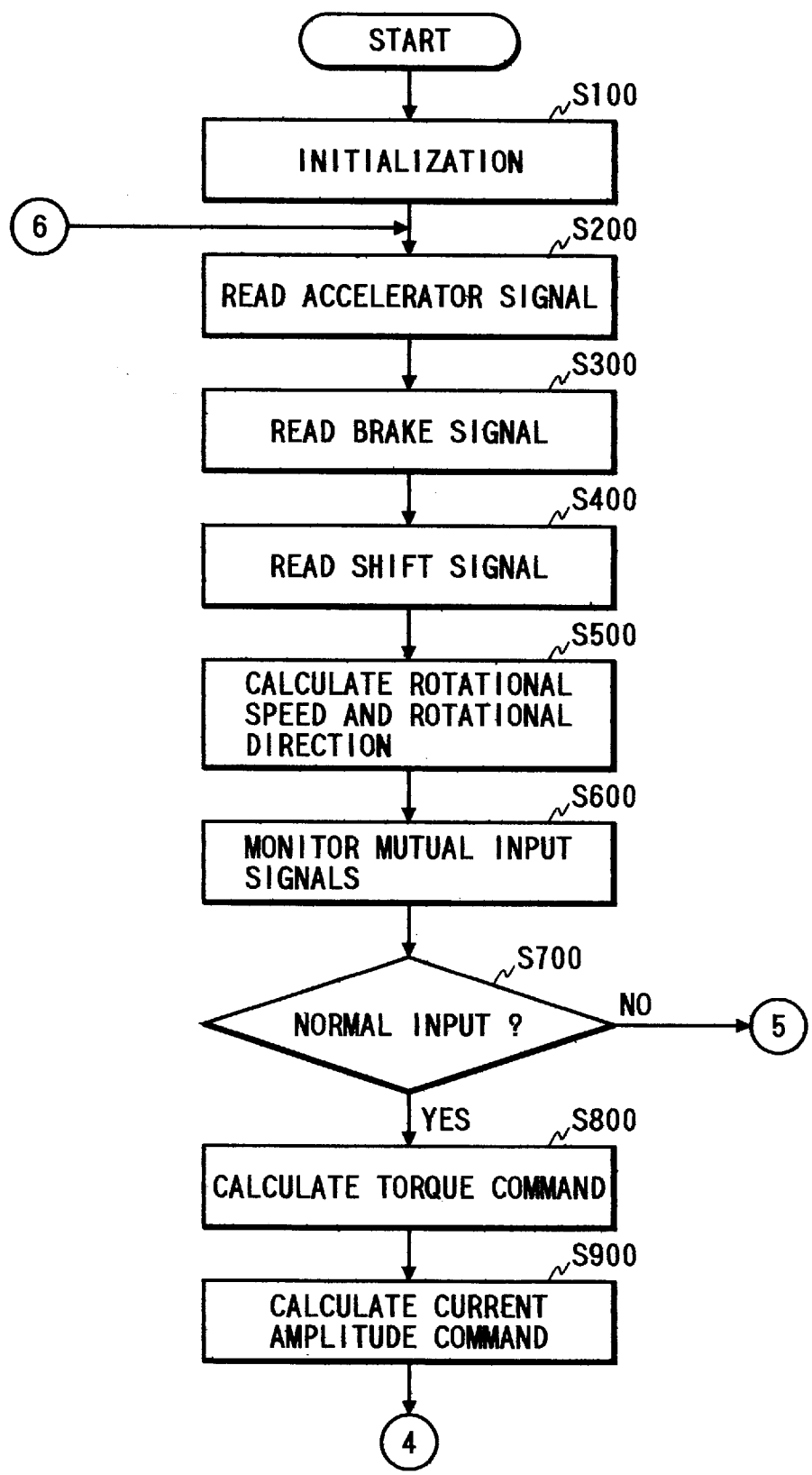
FIG. 9 is a control flow chart of each central processing unit of the electric automotive vehicle driving system in accordance with a second embodiment of the present invention.
Figure 10:
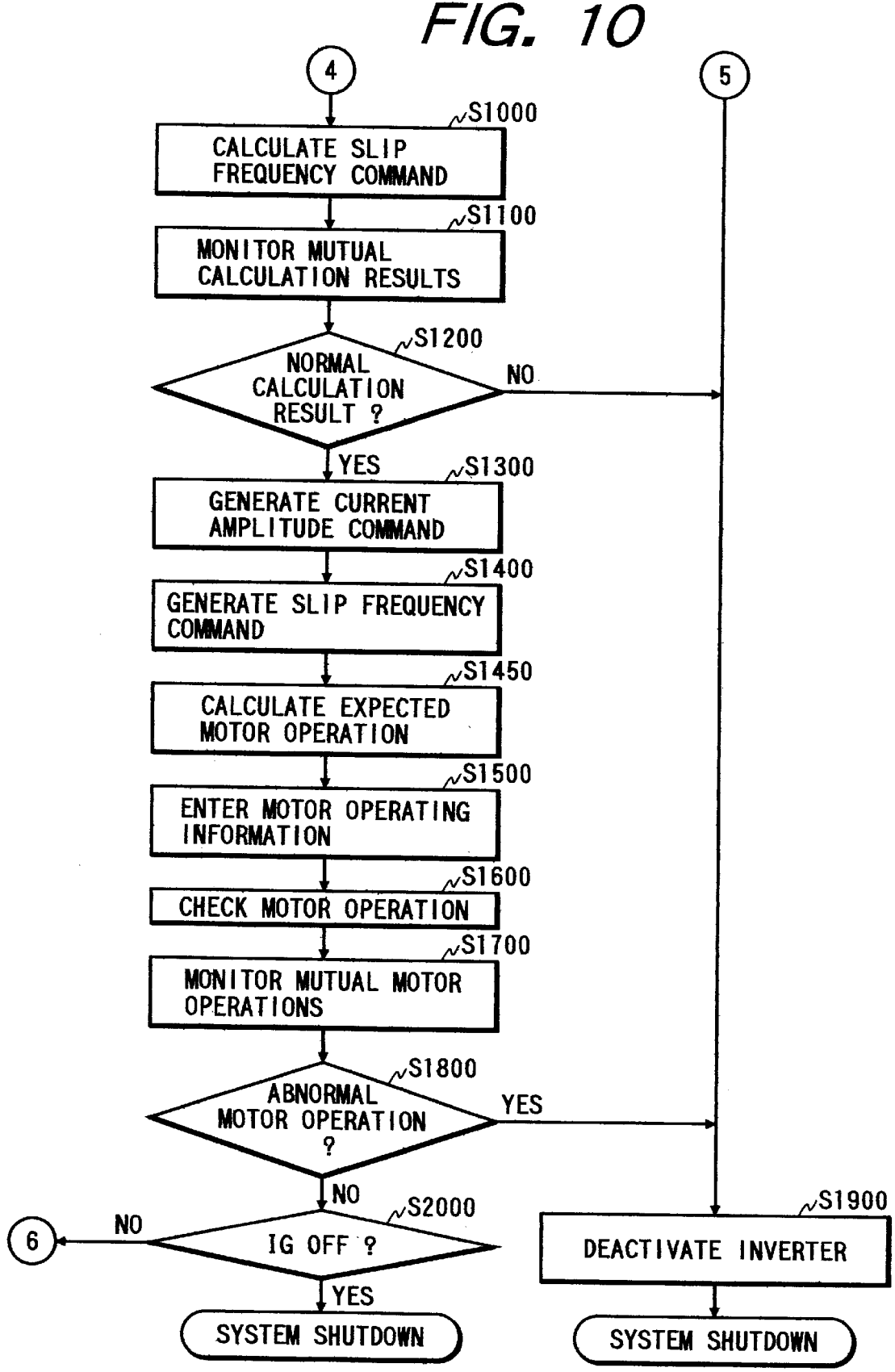
FIG. 10 is a remaining part of the control flow chart of FIG. 9, used in each central processing unit of the electric automotive vehicle driving system in accordance with the second embodiment of the present invention.

Hence, the second embodiment of the present invention uses a slightly modifies flow chart shown in FIGS. 9 and 10, to check the motor operation by considering the delay element derived from the inductance of the driving motor 1. The flow chart of FIGS. 9 and 10 is different from the flow chart of FIGS. 5 and 6 in that step S1450 is newly and supplementally added to calculate expected values of the motor operation. The details of the step S1450 will be explained in detail with reference to the subroutine shown in FIG. 11.

Figure 11:
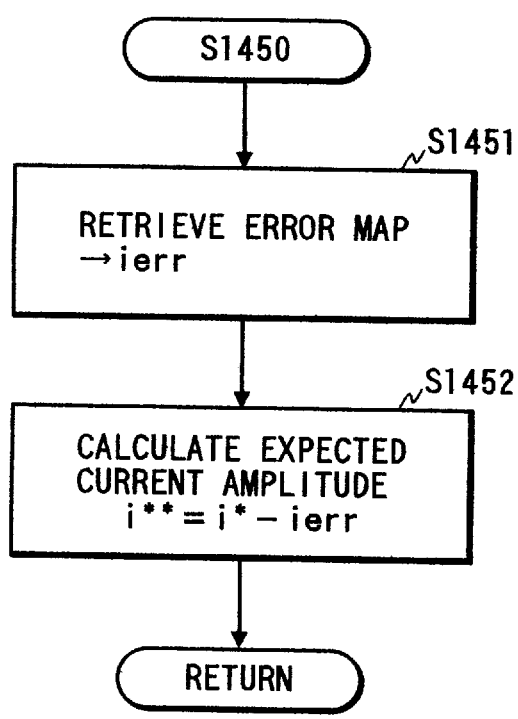
FIG. 11 is a sub program used in calculating an estimated value in accordance with the second embodiment of the present invention.

In step S1451 of the flow chart of FIG. 11, an error map is first retrieved to obtain an error current $i_{err}$ corresponding to the given current amplitude command i*. FIG. 12 is a map showing values of the error current $i_{err}$ in relation to parameters of the motor speed and the torque command (T*). The data indicated in this map represent current values for compensating the lack of actual current amplitude i with respect to current amplitude command i*. Accordingly, an expected current amplitude i** of the actual current is obtained by the following equation.

$$i^{**} = i^* - i_{err} \tag{1}$$

Hence, in step S1452, the expected current amplitude i is calculated base on the relation defined by using the equation (1). Namely, the expected current amplitude i is obtained by subtracting the current amplitude command i* by the error current $i_{err}$ obtained by the retrieval using the error map of FIG. 12. Subsequently, the control flow returns to the main flow of FIG. 10.

Figure 8:
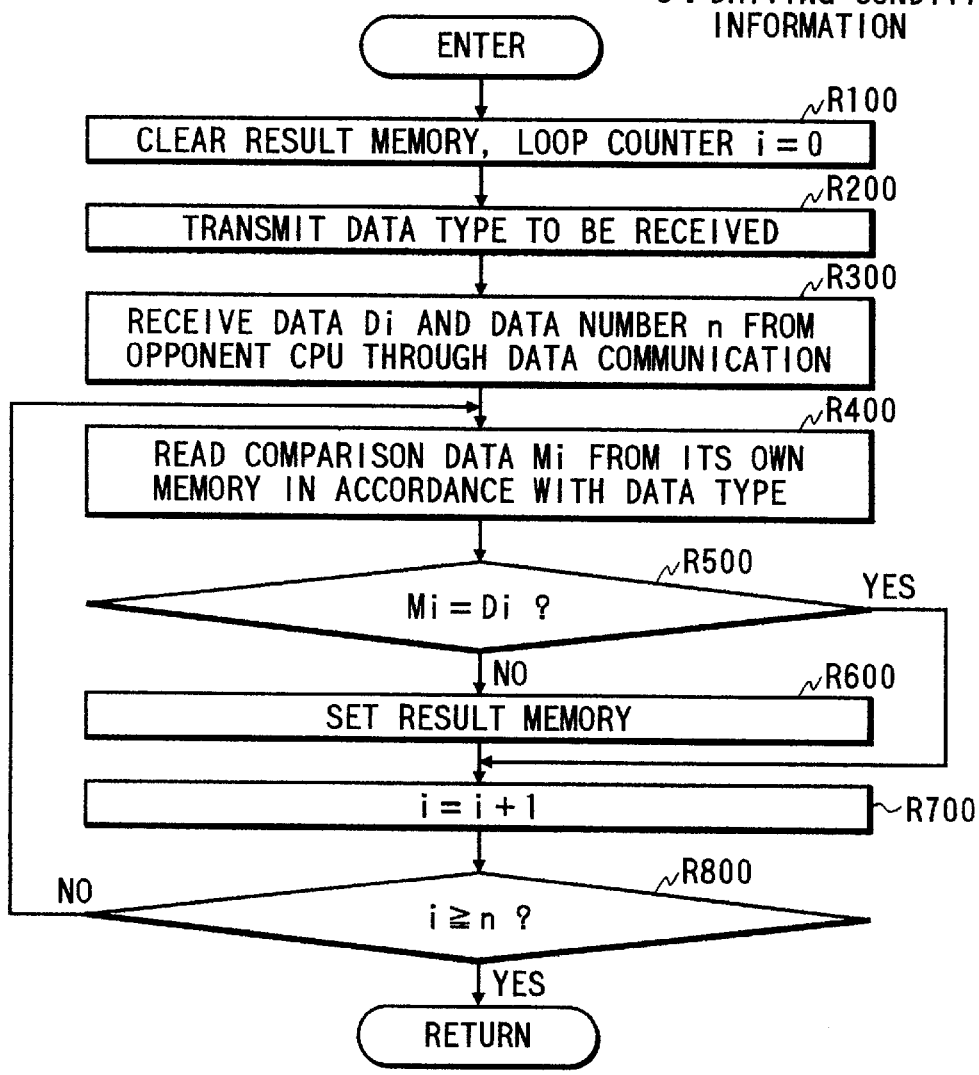
FIG. 8 is a flow chart showing the details of a mutual information monitoring operation in accordance with the first embodiment of the present invention.

More specifically, in the step S1600, the expected current amplitude i** is compared with the actual current amplitude i obtained in the step S1500 of the flow chart of FIG. 8.

In the next step S1700, main central processing unit 63 communicates with sub central processing unit 64 to check whether the mutual operation results of driving motor 1 are identical with each other based on the result memorized in the step S1600. The judgement results are stored in their memories. Furthermore, in step S1800, a judgement is made based on the comparison result of the step S1700. When both of the judgement results of main central processing unit 63 and sub central processing unit 64 indicate the abnormality of driving motor 1, or when these judgement results are different from each other, it is judged that the motor operation is actually abnormal and therefore the control flow proceeds to the step S1900. In the step S1900, the deactivation signal is generated to stop the operation of inverter 2, thereby shutting down the system.

Although, the second embodiment memorizes the error current values in the form of a two-dimensional map, it is also possible to estimate each error between a given command and an actual measuring data by using a linear predictive coding method to perform the system control for considering the influence of the inductance of the driving motor 1.

As explained above, the second embodiment calculates the expected driving information for estimating the actual driving conditions of the driving motor based on the actuation commands calculated by each central processing unit, and judges the abnormality of the system based on the estimated driving information and the actual driving conditional information obtained through the processing of the line currents and the rotational information of the driving motor. Hence, it becomes possible to judge the abnormality accurately even if any control error is caused due to the response delay derived from the inductance of the driving motor when the line current of the driving motor is controlled by the current supply circuit based on the actuation commands.

Third Embodiment

A third embodiment of the present invention will be explained with reference to FIGS. 13 and 14.

In the above-described first and second embodiments, the mutual monitoring through data communications is performed by judging the normality of the system only when both of central processing units agree with each other in the judgement of normality. However, there is a possibility that various signals (such as the acceleration amount signal, the line current signal or the like) may include a noise component, causing dispersion in the values of the sensing data or calculation results in each central processing unit. This kind of dispersion will result in an erroneous judgement in judging the normality or abnormality.

To avoid such an erroneous judgement, it will be possible to provide a predetermined margin in the judgement. However, there will be a drawback that an actual error may not be detected when this margin is a significant large value.

In view of the above, the third embodiment of the present invention utilizes the fact that the output of the inverter increases with increasing actuation command and therefore the noise caused from the inverter is increased correspondingly. More specifically, the third embodiment of the present invention changes the margin in accordance with the actuation command.

Figure 13:
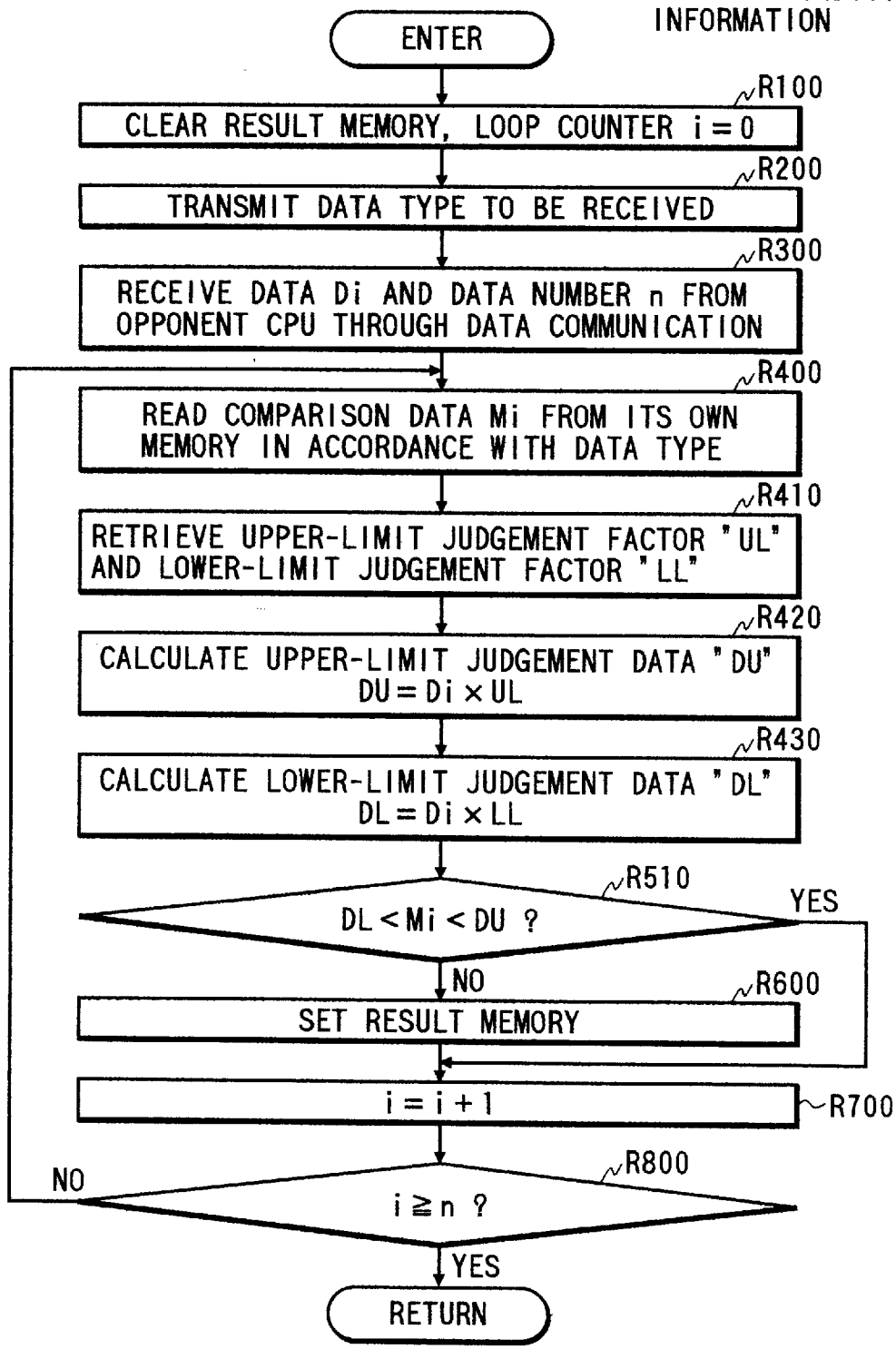
FIG. 13 is a flow chart showing the details of a mutual information monitoring operation in accordance with a third embodiment of the present invention.

FIG. 13 shows a flow chart of the third embodiment. This flow chart is different from the flow chart of FIG. 8 in that a series of steps R410, R420 and R430 is newly added and the judging step R500 is replaced by a new step R510. In this embodiment, the margin is expressed by a pair of judgement coefficients; i.e. a predetermined upper limit and a predetermined lower limit, which have the same absolute values.

Figure 14:
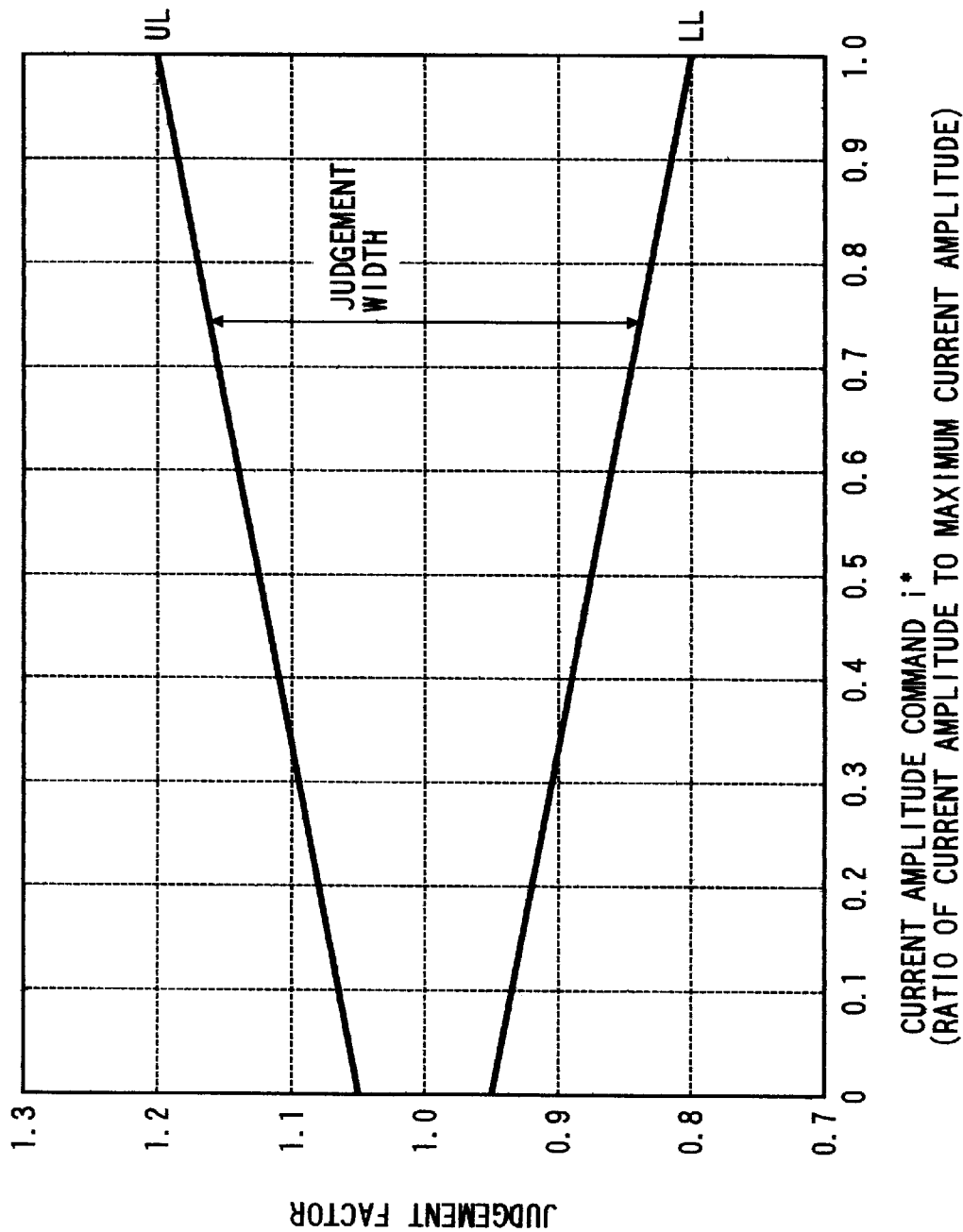
FIG. 14 is a diagram used for determining judgement factors in accordance with the third embodiment of the present invention.

More specifically, in step R410, an upper-limit judgement factor UL and a lower-limit judgement factor LL are retrieved from a given map shown in FIG. 14. The judgement factors are retrieved in relation to the current amplitude command i*. As apparent from FIG. 14, the judgement width, i.e. a zone between upper-limit judgement factor UL and lower-limit judgement factor LL, is enlarged in proportion to the increase of current amplitude command i*. In other words, upper-limit judgement factor UL and lower-limit judgement factor LL are closer to 1 when the current amplitude command i* is 0. And, the difference between these judgement factors and 1 is gradually increased with increasing current amplitude command i*.

In the next step R420, an upper-limit judgement value DU is calculated using the following equation.

$$DU = Di \times UL \tag{2}$$

In the next step R430, a lower-limit judgement value DL is calculated using the following equation.

$$DL = Di \times LL \tag{3}$$

Then, in step R510, a judgement is made to check as to whether or not the comparison data Mi is within a judgement range between DL and DU, using the following numerical expression.

$$DL < Mi < DU \tag{4}$$

With the above judgement, the data Mi of one central processing unit can be compared with the data Di received from the other central processing unit using the margin variable in accordance with the current amplitude command.

Although the above-described third embodiment uses the current amplitude command i* as the actuation command, it will be possible to prepare a judgement factor map with a parameter of slip frequency command ωs*.

As described above, the third embodiment provides the predetermined margin for the abnormality judgement in the mutual monitoring operation between central processing units 63 and 64. This margin is variable in accordance with the given actuation command and is hence always set to an appropriate value, so that the abnormality judgement can be performed accurately without causing any error due to disturbance by noises etc.

Fourth Embodiment

Figure 15:
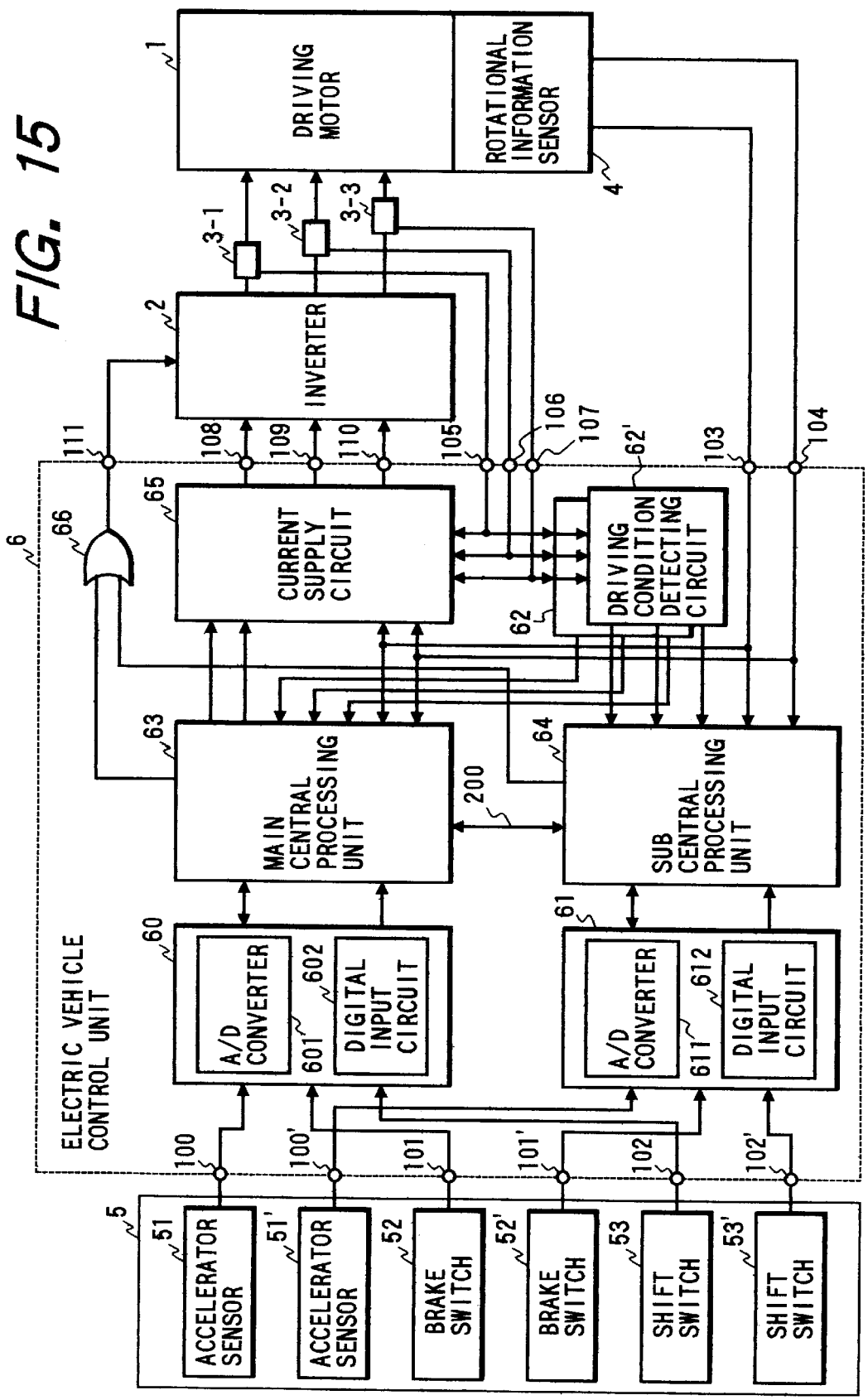
FIG. 15 is a schematic block diagram showing an electric automotive vehicle driving system incorporating a control unit in accordance with a fourth embodiment of the present invention.

Hereinafter, a fourth embodiment of the present invention will be explained with reference to FIG. 15.

The above-described first, second and third embodiments disclose only one set of accelerator sensor 51, brake switch 52 and shift switch 53 provided in driving operational information detecting circuit 5, and the output signals of these sensor and signals are entered into first and second signal input circuits 60 and 61 to perform the abnormality judgement of central processing units. The fourth embodiment is different from these first to third embodiments in that two sets of accelerator sensors, brake switches and shift switches are provided to detect abnormality of driving operational information detecting circuit, as shown in FIG. 15.

Hereinafter, only the difference between the fourth embodiment of FIG. 15 and the first embodiment of FIG. 1 will be explained. The driving operational information detecting circuit 5 comprises two accelerator sensors 51, 51', two brake switches 52, 52' and two shift switches 53, 53'. Two accelerator sensors 51 and 51', each detecting a depression amount of the accelerator pedal, generate voltage signals representing two kinds of acceleration amount signals. Two brake switches 52, 52', each responsive to an operation of the brake pedal, generate two kinds of brake operation signals. Two shift switches 53, 53', each detecting the shift position in response to a movement of the shift lever, generate two kinds of shift signals.

Electric vehicle control unit 6 has a total of six input terminals 100, 100', 101, 101' 102 and 102' for receiving the signals sent out from these accelerator sensors 51, 51', brake switches 52, 52' and shift switches 53, 53'. The acceleration amount signal of accelerator sensor 51 is entered into first signal input circuit 60 through input terminal 100. The acceleration amount signal of accelerator sensor 51' is entered into second signal input circuit 61 through input terminal 100'. The brake operation signal of brake switch 52 is entered into first signal input circuit 60 through input terminal 101. The brake operation signal of brake switch 52' is entered into second signal input circuit 61 through input terminal 101'.

The shift position signal of shift switch 53 is entered into first signal input circuit 60 through input terminal 102. The shift operation signal of shift switch 53' is entered into second signal input circuit 61 through input terminal 102'.

Acceleration amount data ACC, brake switch condition data BRK and shift position data SFT, received by first signal input circuit 60, are sent to main central processing unit 63. Acceleration amount data ACC', brake switch condition data BRK' and shift position data SFT',received by second signal input circuit 61, are sent to sub central processing unit 64.

Each central processing unit has a processing program comprising a main program shown in FIGS. 5, 6 or FIGS. 9, 10 and a sub program shown in FIG. 8 or FIG. 13. Hereinafter, an operation relating to the sub program of FIG. 8 will be chiefly explained. The operation of the sub program is specified by the argument number to be sent to the sub program. When the argument number is 1, the driving operational information are compared with each other. If the data Mi entered into main central processing unit 63 is abnormal, either one of twin series of sensors of driving operational information detecting circuit 5 is abnormal, or the processing section of first signal input circuit 60 or main central processing unit 63 is abnormal.

On the other hand, if the data Di entered into sub central processing unit 64 is abnormal, the other of twin series of sensors of driving operational information detecting circuit 5 is abnormal, or the processing section of second signal input circuit 61 or sub central processing unit 64 is abnormal.

In the step R500 of the sub program of FIG. 8, abnormality of the above-identified driving operation detecting circuit 5 and first and second signal input circuits 60 and 61 can be identified as well as abnormality of central processing units 63 and 64. It is needless to say that this abnormality judgement can be performed using the sub program of FIG. 13.

Fifth Embodiment

A fifth embodiment of the present invention will be explained with reference to FIGS. 16 and 17.

In the first to fourth embodiments, when main central processing unit 63 and sub central processing unit 64 respectively receive the driving operational information or driving conditional information, there is the possibility that these driving operational information or driving conditional information are entered at different timings into main central processing unit 63 and sub central processing unit 64 when the clock frequencies are different between these two processing units 63 and 64 since the clock frequency determines the machine cycle of the operation performed in each central processing unit. Such a disagreement in the clock frequency will result in an erroneous judgement in the mutual monitoring operation.

Figure 16:
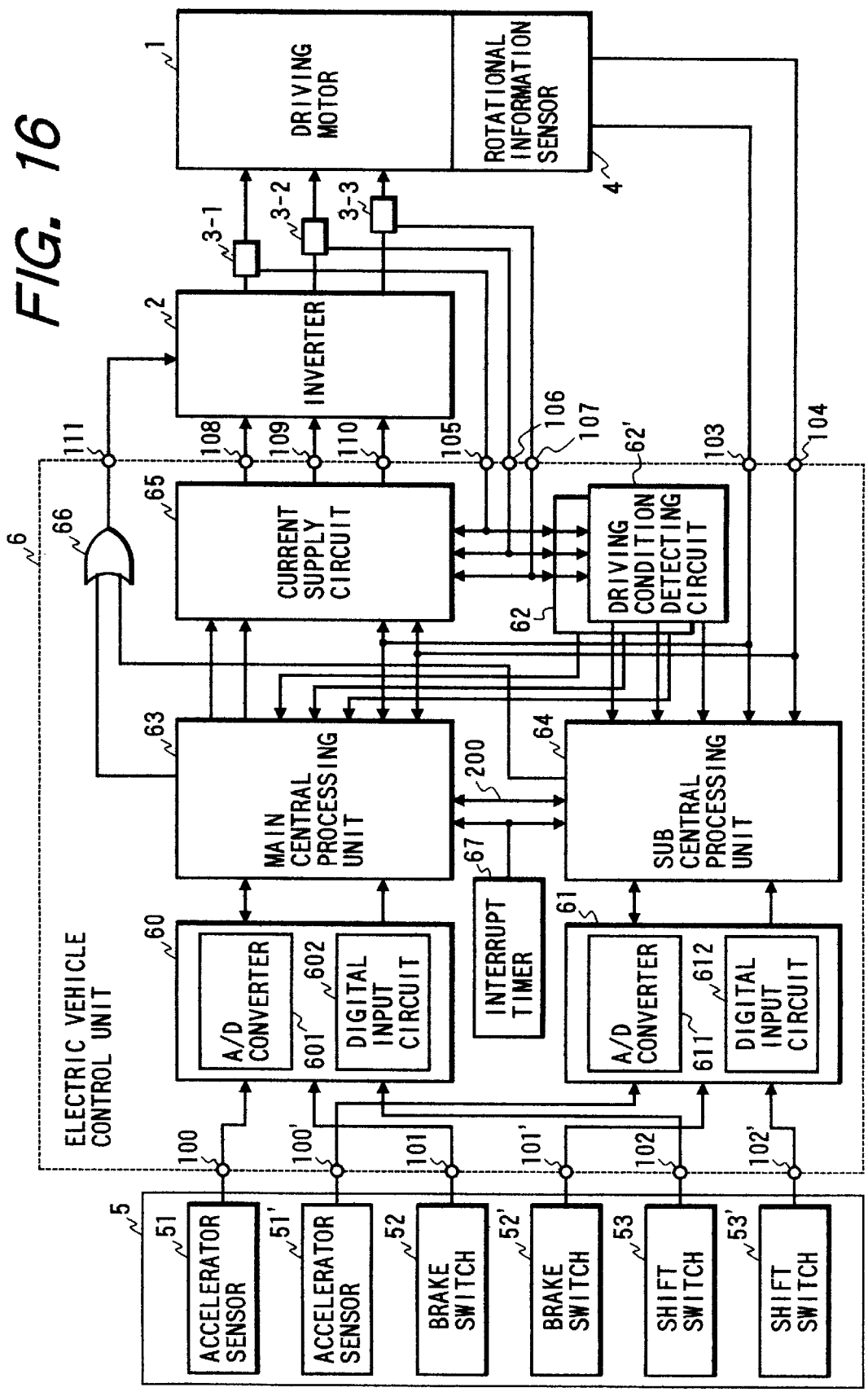
FIG. 16 is a schematic block diagram showing an electric automotive vehicle driving system incorporating a control unit in accordance with a fifth embodiment of the present invention.

In order to solve this kind of problems, the fifth embodiment of the present invention provides the arrangement shown in FIG. 16. That is, the arrangement of the fifth embodiment is different from the fourth embodiment of FIG. 15 in that electric vehicle control unit 6 comprises an interrupt timer 67 which generates clock signals at predetermined intervals of 4 ms and is connected to a hardware interrupt input terminal of each of main central processing unit 63 and sub central processing unit 64. FIG. 17 shows an interrupt processing program triggered by the clock signal.

The interrupt processing program of FIG. 17 is executed in each of main central processing unit 63 and sub central processing unit 64 in response to the clock signal generated every 4 ms from interrupt timer 67. More specifically, in step IRP100, the acceleration amount signal is read. Main central processing unit 63 memorizes the acceleration amount data ACC in its memory, while sub central processing unit 64 memorizes the acceleration amount data ACC' in its memory.

Next, in step IRP200, the brake operation signal is read. Main central processing unit 63 memorizes the brake switch condition data BRK in its memory, while sub central processing unit 64 memorizes the brake switch condition data BRK' in its memory. In step IRP300, main central processing unit 63 counts the cycle of the A-phase signal to obtain the rotational speed Nm of driving motor 1 based on the two-phase pulse signals and memorizes it in the memory.

Sub central processing unit 64 counts the cycle of the B-phase signal to obtain the rotational speed Nm' of driving motor 1 based on the two-phase pulse signals and memorizes it in the memory.

In step IRP400, main central processing unit 63 reads the level of the A-phase signal in response to the building-up of the B-phase signal to determine the rotational direction Dir, and memorizes it in the memory. Sub central processing unit 64 reads the level of the B-phase signal in response to the building-up of the A-phase signal to determine the rotational direction Dir, and memorizes it in the memory.

In step IRP500, main central processing unit 63 memorizes the actual current amplitude i, the frequency ω of the line current flowing through the motor, and the phase difference θ between the U-phase line current and the V-phase line current based on the outputs of driving condition detecting circuit 62. The phase difference θ is a 1-bit digital value indicating an advance or retard amount between the U-phase line current and the V-phase line current. Furthermore, in the same step IRP500, sub central processing unit 64 memorizes the actual current amplitude i', the frequency ω' of the line current flowing through the motor, and the phase difference θ between the U-phase line current and the V-phase line current based on the outputs of driving condition detecting circuit 62'.

The memory data, thus memorized in this interrupt routine, are monitored each other between main central processing unit 63 and sub central processing unit 64 in accordance with the sub program shown in FIG. 8.

The above-described data input operation of the driving operational information and the driving conditional information is simultaneously performed in each of main central processing unit 63 and sub central processing unit 64 in response to the trigger signal fed from interrupt timer 67, without causing any delay therebetween. Hence, it is assured that main central processing unit 63 and sub central processing unit 64 receive the driving operational information and the driving conditional information detected at the same time. Accordingly, the monitoring operation of checking the calculation results between main central processing unit 63 and sub central processing unit 64 can be correctly performed through data communication.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An electric vehicle control apparatus comprising:

a rotational information detecting means for detecting rotational information of a driving motor;

a driving operational information detecting means for detecting driving operational information of the electric vehicle;

a current detecting means for detecting line currents flowing through the driving motor;

a driving condition detecting means for detecting driving conditional information of the driving motor based on the line currents detected by said current detecting means; and a plurality of central processing units each having a calculating means and a driving condition confirming means, said calculating means receiving said rotational information and said driving operational information and calculating an actuation command of the driving motor based on said rotational information and said driving operational information, said driving condition confirming means receiving said driving conditional information and confirming a driving condition of the driving motor, wherein said actuation command is sent from one central processing unit to a current supply means connected to supply current for the driving motor, said plural central processing units are connected via a communication line, to exchange data relating to a least one of said driving operational information, said actuation command and said driving conditional information between said plural central processing units via said communication line, and an operation selecting means is provided in each of said plural central processing units for comparing the information exchanged between said plural central processing units and for making a judgment as to whether the current supply means should be continuously operated or deactivated.

2. The electric vehicle control apparatus in accordance with claim 1, wherein said central processing units further comprise an estimating means for estimating an expected operational condition of the driving motor based on the actuation command, said driving condition confirming means compares said expected operational condition with said driving conditional information to confirm the presence of abnormality of the driving motor, and said central processing units exchange the data confirmed by said driving condition confirming means as said driving conditional information via said communications line.

3. The electric vehicle control apparatus in accordance with claim 1, wherein said operation selecting means performs the comparison of exchanged information with a predetermined margin, and said margin is variable in accordance with the actuation command calculated in said calculating means.

4. The electric vehicle control apparatus in accordance with claim 1, wherein said driving operational information detecting means and said driving condition detecting means are exclusively provided for each of said plural central processing units.

5. The electric vehicle control apparatus in accordance with claim 1, further comprising a sync means which generates a sync signal for inputting said driving operational information and said driving conditional information synchronously to said plural central processing units.

\* \* \* \* \*